US009296565B2

(12) United States Patent
Batchelder et al.

(10) Patent No.: US 9,296,565 B2
(45) Date of Patent: Mar. 29, 2016

(54) SNAP-ON POSITION LIMITER FOR A CONVEYOR BELT

(71) Applicant: Laitram, L.L.C., Harahan, LA (US)

(72) Inventors: Jeff Batchelder, Grand Haven, MI (US); Michael Hendrik DeGroot, Rockford, MI (US); Friso Antonius Maria Oonk, Vragender (NL); Laurentius G. J. Wolters, Lichtenvoorde (NL); Edward T. Mol, Marne, MI (US); Ruizhe Ma, Grand Rapids, MI (US); Roel Marcel Mellink, Lichtenvoorde (NL); Gerko Hulshof, Aalten (NL)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 14/602,455

(22) Filed: Jan. 22, 2015

(65) Prior Publication Data
US 2015/0210475 A1     Jul. 30, 2015

Related U.S. Application Data

(60) Provisional application No. 61/931,058, filed on Jan. 24, 2014, provisional application No. 62/006,427, filed on Jun. 2, 2014, provisional application No. 62/061,346, filed on Oct. 8, 2014.

(51) Int. Cl.
| | |
|---|---|
| *B65G 15/62* | (2006.01) |
| *B65G 23/06* | (2006.01) |
| *B65G 45/12* | (2006.01) |
| *B65G 23/44* | (2006.01) |

(52) U.S. Cl.
CPC ............. *B65G 15/62* (2013.01); *B65G 23/06* (2013.01); *B65G 23/44* (2013.01); *B65G 45/12* (2013.01)

(58) Field of Classification Search
CPC ........ B65G 15/60; B65G 15/62; B65G 15/64; B65G 23/02; B65G 23/06; B65G 23/12; B65G 23/44; B65G 45/12
See application file for complete search history.

(56) References Cited

U.S. PATENT DOCUMENTS

| | | | |
|---|---|---|---|
| 3,015,381 A | 1/1962 | Mohwinkel et al. | |
| 4,492,304 A * | 1/1985 | Geis | B65G 21/20 198/837 |
| 4,721,495 A | 1/1988 | Kan et al. | |

(Continued)

FOREIGN PATENT DOCUMENTS

EP     1418139 A1     5/2004

OTHER PUBLICATIONS

International Search Report and Written Opinion of the International Searching Authority, PCT/US2015/012385, mailed Apr. 28, 2015, Korean Intellectual Property Office, Republic of Korea.

*Primary Examiner* — Leslie A Nicholson, III
*Assistant Examiner* — Keith R Campbell
(74) *Attorney, Agent, or Firm* — Catherine M. Bishop

(57) ABSTRACT

A conveyor employs a low-tension, direct drive conveyor belt, and a snap-on position limiter for ensuring proper engagement of the belt and a drive sprocket. The position limiter includes a body, a limiting surface and a snap clap opposite the limiting surface for snapping the position limiter to a mounting shaft. The limiting surface may comprise rotatable rollers mounted to the body, or a continuous arcuate surface. The position limiter may include a mounting arm for mounting a conveyor belt scraper at the front of the position limiter.

43 Claims, 29 Drawing Sheets

(56) References Cited

U.S. PATENT DOCUMENTS

| | | | |
|---|---|---|---|
| 5,190,145 A * | 3/1993 | Ledginham | B65G 21/22 |
| | | | 198/841 |
| 5,310,047 A * | 5/1994 | Ledingham | B65G 15/62 |
| | | | 198/841 |
| 5,632,915 A * | 5/1997 | Schnetzer | B23K 26/702 |
| | | | 198/689.1 |
| 7,131,531 B1 * | 11/2006 | Ryan | B65G 15/60 |
| | | | 193/35 R |
| 7,850,562 B2 | 12/2010 | DeGroot | |
| 8,267,239 B2 | 9/2012 | Swinderman et al. | |
| 8,322,521 B2 * | 12/2012 | Zhang | B65G 21/20 |
| | | | 198/842 |
| 8,973,739 B2 | 3/2015 | Zieger | |
| 2003/0192776 A1 | 10/2003 | Sousek et al. | |
| 2006/0011453 A1 | 1/2006 | Sedlacek | |
| 2006/0049023 A1 * | 3/2006 | Dietsch | B65G 45/16 |
| | | | 198/499 |

* cited by examiner

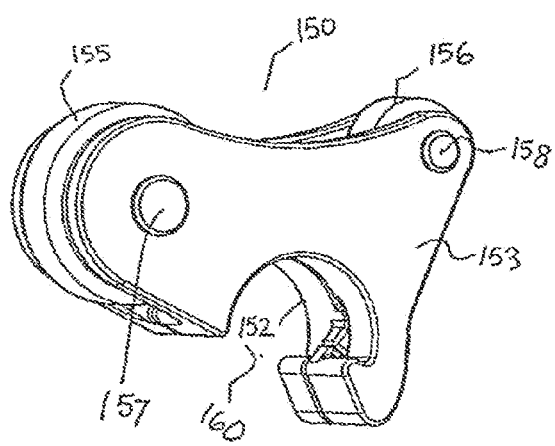
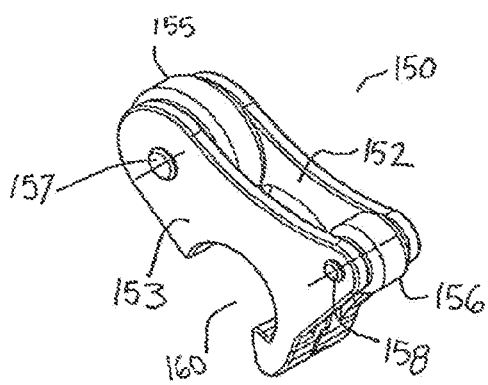
FIG. 9A  FIG. 9B
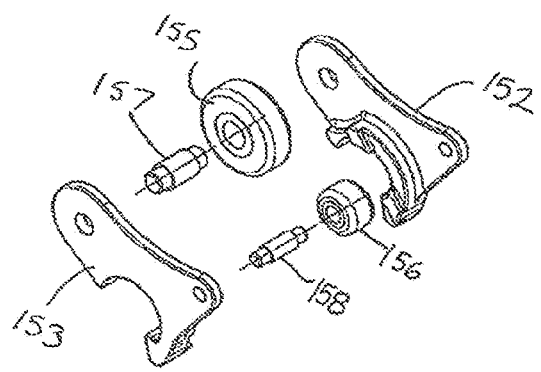
FIG. 10

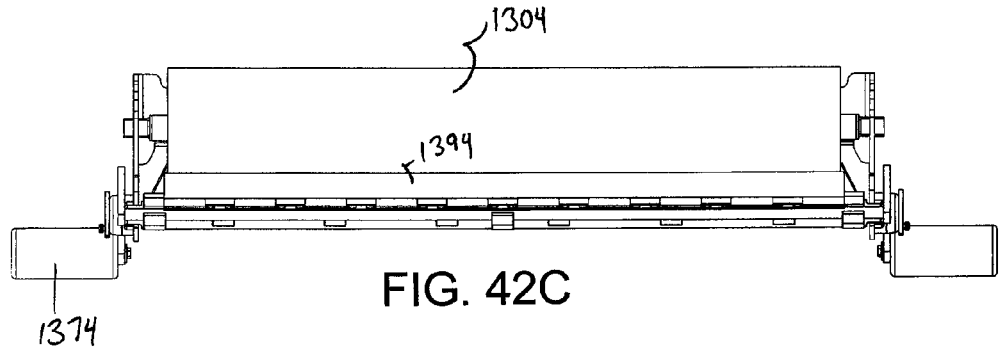
FIG. 42C
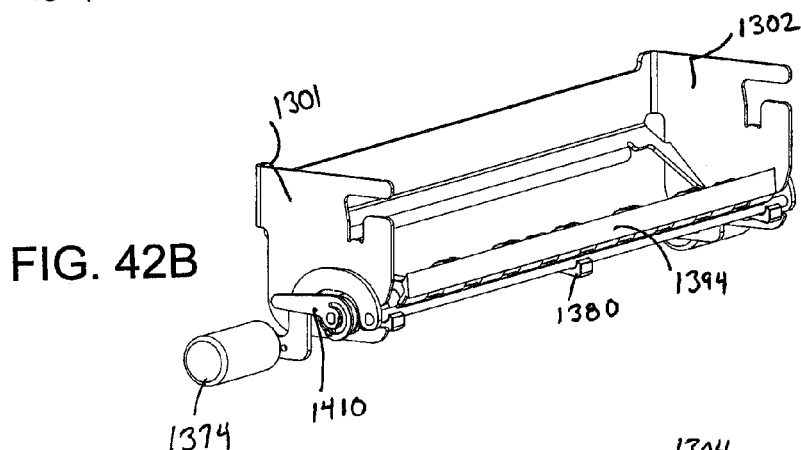
FIG. 42B
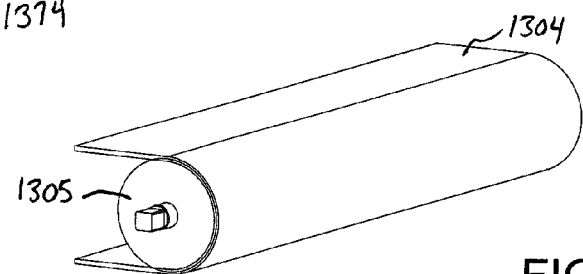
FIG. 42A
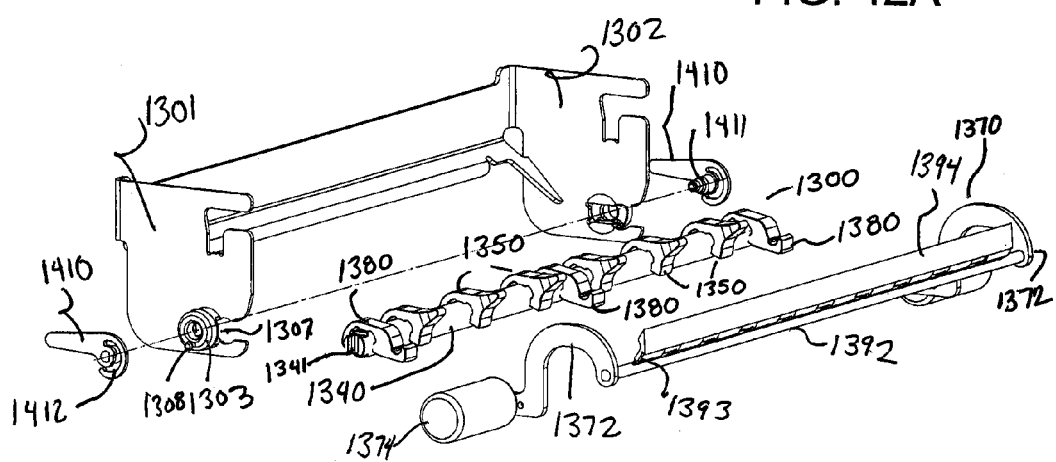

SNAP-ON POSITION LIMITER FOR A CONVEYOR BELT

RELATED APPLICATIONS

This application claims priority to U.S. Provisional Patent Application No. 61/931,058 entitled "Snap-On Position Limiter for a Conveyor Belt", filed Jan. 24, 2014, and U.S. Provisional Patent Application No. 62/006,427 entitled "Snap-On Position Limiter for a Conveyor Belt", filed Jun. 2, 2014 and U.S. Provisional Patent Application No. 62/061,346 entitled "Snap-On Position Limiter for a Conveyor Belt", filed Oct. 8, 2014. The contents of the aforementioned applications are incorporated herein by reference.

BACKGROUND

The invention relates generally to power-driven conveyors and, more particularly, to thermoplastic, toothed endless belts driven by sprockets.

Position limiters, such as described in U.S. Pat. No. 7,850,562, the contents of which are incorporated herein by reference, are used in low tension, positive drive belting systems to ensure proper engagement of the belt and drive sprocket by controlling the position of the belt during the drive tooth hand-off process. A position limiter may be disposed against the belt near the exit point. Examples of position limiters include scrapers, rollers and shoes.

Current position limiters are fixed to a mounting shaft, which may trap dirt and debris and inhibit disassembly and-or replacement of the position limiter. In addition, current position limiters are generally placed where the conveyor belt would naturally fall away from the drive sprocket when no pretension is applied, which is typically at 165° of wrap from where the belt enters the drive sprocket. The position limiter thus competes for the same space as a belt scraper, if used. Further, the position limiter must be axially aligned with the drive sprockets, requiring locking collars or fasteners that can become harborage zones for bacteria, thus presenting risks to food safety.

SUMMARY

A position limiter for a positively-driven, low tension conveyor belt includes a snap clamp for mounting the position limiter to a mounting shaft. The mounting shaft places the mounted position limiter in position adjacent to a conveyor belt and sprocket. Opposite the snap clamp, the position limiter includes a limiting surface having a convex and concave portion, or a limiting surface formed by rotatable rollers mounted to the position limiter body. The mounting clamp may include an alignment notch for receiving a corresponding tab on the snap clamp to retain the position limiter axially relative to the mounting shaft. The position limiter may include an arm for attaching a conveyor belt scraper. The assembly for mounting the position limiter may also be configured to accommodate conveyor belts having flights or other characteristics.

According to one aspect of the invention, a position limiter for a conveyor belt comprises a body, a limiting surface extending at a first end of the body and a snap clamp at a second end of the body for fixing the body to a shaft.

According to another aspect, a direct drive conveyor comprises an endless belt, at least one drive sprocket for engaging and driving the endless belt, the sprocket having drivers spaced at a selected sprocket pitch, a first shaft below the drive sprocket, and a position limiter mounted to the shaft using a snap clamp such that a limiting surface of the position limiter faces the endless belt to ensure engagement between the drive sprocket and endless belt without increasing tension throughout the belt.

According to still another aspect, a position limiter for a conveyor belt comprises a body having an upper edge, a first roller protruding from the upper edge and a second roller protruding from the upper edge.

According to another aspect, a direct drive conveyor comprises an endless belt, at least one drive sprocket for engaging and driving the endless belt, the sprocket having drivers spaced at a selected sprocket pitch, a shaft below the drive sprocket and a position limiter mounted to the shaft such that a limiting surface of the position limiter faces the endless belt to ensure engagement between the drive sprocket and endless belt without increasing tension throughout the belt. The limiting surface extends along the endless belt by a distance greater than the selected sprocket pitch.

BRIEF DESCRIPTION OF THE DRAWINGS

The disclosed systems and methods can be understood with reference to the following drawings. The components in the drawings are not necessarily to scale.

FIG. 9A is an isometric view of a position limiter including mounted rollers according to another embodiment of the invention;

FIG. 9B is another view of the position limiter of FIG. 9A;

FIG. 10 is an exploded view of the position limiter of FIG. 9A;

FIGS. 42A-42C show an end portion of a conveyor including a plurality of position limiters and a scraper blade assembly mounted to a shaft according to an embodiment of the invention;

DETAILED DESCRIPTION

A conveyor employs a positively-driven conveyor belt, a drive sprocket and a snap-on position limiter to ensure proper engagement of the belt and drive sprocket. The position limiter may be installed, retained and removed from a shaft without the use of tools, or with minimal use of tools. Embodiments of the position limiter employ a snap clamp having an anchor, such as a protrusion that engages a channel in a shaft of the conveyor, referred to as a toolbar. A body of the snap clamp mates with the body of the shaft. Optionally, an axial tab engages a notch or other seat in a shaft. The relaxed body of the snap clamp may be different than the shaft, but stretched or compressed to match the shaft and lock into place. The snap clamp may be used to interchangeably mount components to the shaft while locking the components axially and radially relative to the shaft during operation. The invention will be described below relative to certain illustrative embodiments, though the invention is not limited to the illustrative embodiments.

Figure 1:
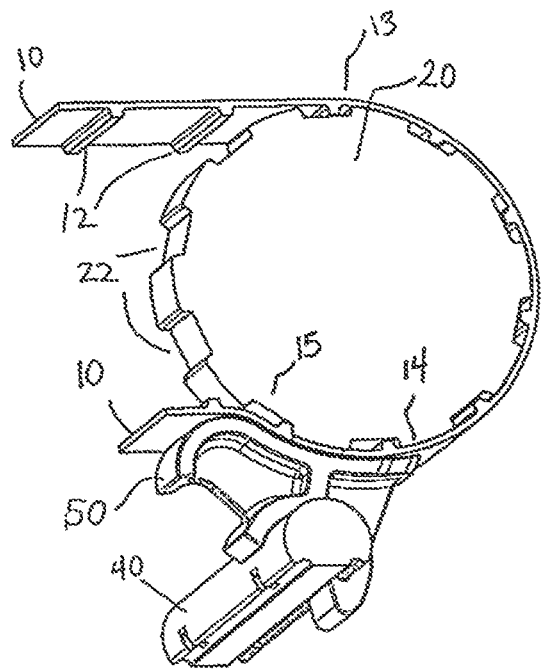
FIG. 1 shows an end portion of a low-tension, direct drive conveyor belt system including a position limiter according to one embodiment of the invention.

FIG. 1 illustrates a portion of a low-tension, direct drive conveyor belt system including a position limiter 50 according to one embodiment of the invention. The illustrative conveyor belt system includes a low-tension, positively driven conveyor belt, such as THERMODRIVE® belting, available from Intralox, LLC of Harahan, La. The illustrative conveyor belt 10 includes drive elements, shown as drive teeth 12 (also known as drive bars) that engage recesses 22 in the corresponding drive sprocket 20. A position limiter 50, mounted to a shaft 40 below the sprocket, ensures that the belt engages the sprocket 20. The position limiter 50 is positioned relative to the sprocket 20 so as to create a channel through which the belt 10 passes. In the illustrative embodiment, the position limiter 50 snaps onto the shaft to facilitate assembly and disassembly of the conveyor system. The shaft includes engagement means to limit the axial and radial movement of the position limiter once snapped onto the shaft, as described below. In the illustrative embodiment, the position limiter 50 is plastic and the shaft 40 is stainless steel, though other materials may be used.

In the illustrative embodiment, the pitch of the sprocket is less than the pitch of the conveyor belt, so that only one tooth on the conveyor belt is actively driven by the sprocket at a time. The belt engages the sprocket at a top position 13 and begins to wrap around the sprocket 20. The sprocket 20 actively engages a drive tooth 12 at an activation position and releases the drive tooth at a release position. In the illustrative embodiment, the position limiter 50 is located such that the front of the limiting surface abuts the conveyor belt at a front position that is between about 160° and about 220° from the top position 13 (the top position being 0°). The position limiter limiting surface extends preferably at least one full pitch (for example, greater than 36° for a ten toothed-sprocket) before pulling away from the belt at release position 15. In one embodiment, the release position 15 is at about 250° from the top position 13, though the invention is not so limited. Preferably, the position limiter is mounted out of the product stream and is shaped to prevent the accumulation of product. Absent the position limiter, the belt, when not under pretension, would tend to release from the sprocket at about 165°. The illustrative position limiter 50 permits greater belt wrap around the sprocket, thereby moving the position limiter further away from the conveyed food stream.

Preferably, the sprocket effectively drives only one tooth of the sprocket at a time, except for the duration in which a leading driven tooth disengages from the sprocket and hands off to the immediately trailing tooth as the trailing tooth becomes the leading driven tooth. The position limiter 50 helps control this handoff.

Figure 2:
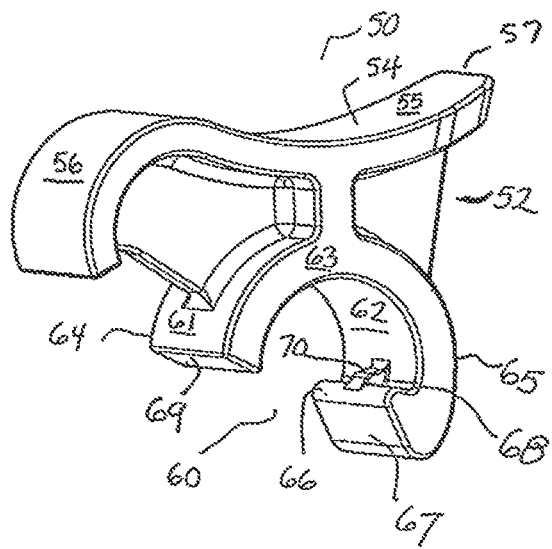
FIG. 2 is an isometric view of the position limiter of FIG. 1.

Referring to FIG. 2, a position limiter 50 of one embodiment of the invention includes a main body 52. The top of the main body forms a limiting surface 54 designed to engage a conveyor belt 10 to ensure proper engagement between the belt and corresponding sprocket. The illustrative limiting surface 54 covers a length that is greater than one sprocket pitch, though the invention is not so limited. A fastening member, illustrated as a snap clamp 60, at the opposite end of the main body mounts the position limiter to a shaft.

The limiting surface 54 provides area contact on the conveyor belt, and includes a concave portion 55 at a front end connected to a convex portion 56 at a rear end. The concave portion 55 and convex portion 56 may be connected tangentially. The illustrative concave portion has a shallower arc than the arc of the convex portion 56. As shown, the concave portion 55 matches the profile of the associated sprocket. The concave portion preferable curves through an arc corresponding to at least and preferably greater than one pitch of the sprocket (at least 36° for a 10-toothed sprocket). The lead edge 57 of the limiting surface may be sharp or otherwise shaped. The shape and size of the convex portion 56 is selected depending on the properties of the associated conveyor belt. The convex portion 56 manages the backbend of the belt, so the shape and size of the convex portion 56 relate to the rate of backbend of the belt and are selected to adequately manage the backbend, and controls the disengagement of the driven belt tooth, gently forcing a tooth back into a driven recess as it approaches the limiter. The transition between the convex and concave portion corresponds to the release point 15 of the conveyor belt from the sprocket 20.

The illustrative body 52 connects the limiting surface 54 to the snap clamp 60 and may be shaped to reduce mass.

The illustrative snap clamp 60 comprises a substantially semi-circular gripping element forming two legs 64 and 65. The clamp 60 is defined by a radially outer surface 61, a radially inner surface 62 and side surfaces 63. The first leg 64 terminates in a flat end surface 69 while the second leg 65 terminates in a barbed tip 66. The barbed tip is defined by an angled tip outer surface 67 and an inner tip surface 68, which intersect to form the barb. The inner tip surface extends radially inwards from the radially inner surface 62. A tab 70 extends between the radially inner surface 62 of the clamp and the tip 66. The tab 70 matches a recess on a corresponding shaft 40, as described below.

The radially inner surface 62 may include clean out chambers or recesses to enhance cleanability when the position limiter is mounted to a shaft.

The tip 66 may be lower than the end 69 of the first leg when the inner tip surface 68 is substantially horizontal. The bottom surface 69 and tip inner surface 68 may be non parallel.

The stiffness and tension of the snap clamp 60 may be varied depending on the material used, thickness of the legs, degree of wrap of the gripping element and other factors that may be varied.

Preferably, the snap clamp 60 is integral with the body of the position limiter, though the invention is not so limited.

Figure 3A:
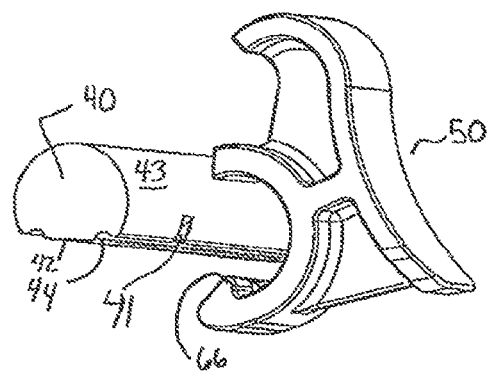
FIGS. 3A-3C illustrate the process of mounting the position limiter of FIG. 1 to a mounting bar.
Figure 3B:
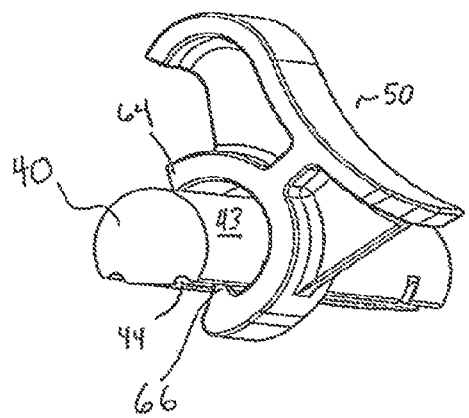

FIGS. 3A-3B illustrate the process of snapping a position limiter including a snap clamp, such as the position limiter 50, onto a shaft 40 in a conveying system according to one embodiment of the invention. The illustrative method of affixing the position limiter to a shaft can be used to affix any conveyor component to another conveyor member using a snap lock geometry integrated into both the conveyor component and the conveyor member. The conveyor component is attached to the frame by stretching the component over the center about the conveyor member by imparting a force greater than what the component experiences at rest. Mating geometry in the position limiter and shaft engages to affix the position limiter to the shaft. In one embodiment, the smallest inner diameter of the snap clamp is smaller than the outer diameter of the mating conveyor member. Alternatively, the position limiter or other conveyor component may compress to allow engagement.

Figure 3C:
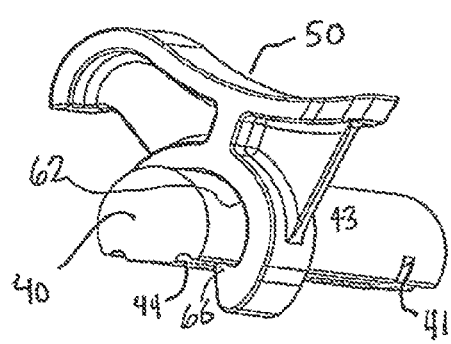
Figure 4:
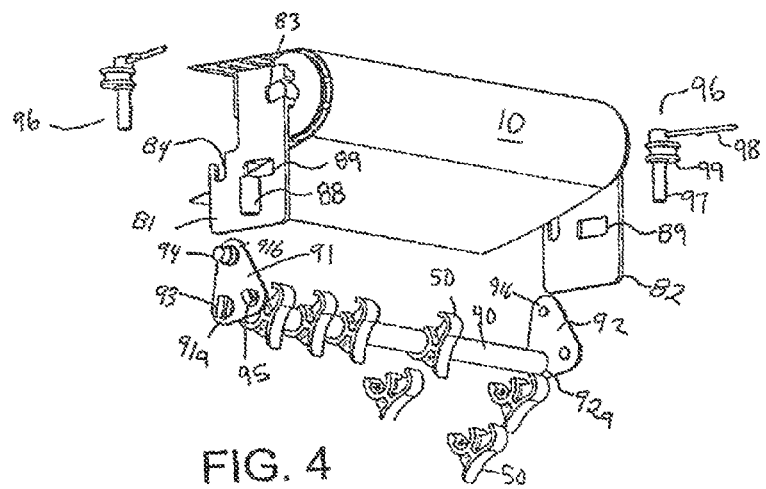
FIG. 4 is an exploded view of an end of a low-tension, direct drive conveyor belt system including a position limiter assembly according to one embodiment of the invention.

In FIGS. 3A and 3B, the illustrative shaft 40 has a flat bottom surface 42 extending between ends of a rounded outer surface 43. The flat bottom surface 42 includes at least one substantially linear channel 44 extending from a first end to a second end. As shown in FIG. 3A, the position limiter is first placed near the shaft such that the axial alignment tab 70 aligns with an alignment notch 41 in the shaft 40 and the legs 64, 65 straddle the shaft 40. Then, an operator inserts the tip 66, which functions as a key, into a recess 44, which functions as a keyway, on the flat surface side 42 of the shaft 40, as shown in FIG. 3B, while rotating the first leg 64 about the outer surface 43 of the shaft until the first leg 64 contacts the shaft 40. Then, as shown in FIG. 3C, the user initiates clamping force by stretching the leg 64 over the center of the shaft to snap the position limiter 50 into place, while inserting the tab 70 into the notch 41 to prevent axial movement of the position limiter relative to the shaft. The engagement between the tip 66 and recess 44 prevents radial movement of the position limiter 50 about the shaft 40. The legs of the snap clamp flex slightly to allow mounting of the position limiter 50 onto the shaft, and then spring back into place after being rotated over center to lock the position limiter onto the shaft 40. When snapped on, the axially inner surface 62 of the position limiter 50 abuts the rounded outer surface 43 of the shaft 44.

In another embodiment, a continuous clamping force is maintained by making the internal diameter of legs 64, 65 smaller than the outer diameter of shaft 40 so that the illustrative snap clamp 60 is under continuous strain while remaining within the yield limits of its material properties.

In other embodiments, a small protrusion is added to the periphery of the inner radial surface 62 of leg 64 such that it mates with a notch in the shaft 40 when the clamp 60 is fully seated on the shaft 40.

The lock-in place design of the position limiter enables assembly on a shaft without fasteners or other tools. The illustrative snap clamp ensures that the component mounted thereon does not rotate about or slide along the shaft 40.

FIGS. 4-7B illustrate a process of mounting a shaft 40 with a plurality of position limiters 50 mounted thereon onto a conveyor frame. The conveyor frame includes conveyor end plates 81, 82 for mounting a shaft or axle 21 containing one or more sprockets 20 and receiving a shaft 40 for holding one or more position limiters 50 in place against a conveyor belt 10. The conveyor end plates each include a recess 83 for mounting the shaft containing sprockets 20. As shown, axles 21 extending from the sprocket are inserted into the recesses 83. As shown, the shaft 40 is mounted between two shaft mounting plates 91, 92, which are mounted to the conveyor frame to position the position limiters 50 relative to the conveyor belt 10. A series of position limiters 50 is mounted along the length of the shaft 40.

The illustrative shaft mounting plates have the shape of a rounded triangle. The shaft 40 is mounted between two points 91a, 92a on the plates 91, 92. Opposite the end of the shaft, the shaft mounting plates include mounting tabs 93, which have flat sides in the illustrative embodiment. Flat sided mounting tabs 95 extend from another position on the plates 91, 92.

Tools 96 are provided for engaging the tabs 93, 95 on the triangular mounting plates 91, 92 to position and orient the shaft and position limiters. Each tool 96 includes a stem 97, handle 98 and offset cam portion 99 forming a channel.

Mounting tabs 94 extend from a third point 91b, 92b in the triangular shaft mounting plate. The illustrative mounting tabs are circular in cross-section, though the invention is not so limited. Recesses 84 in the conveyor end plates rotatably receive the mounting tabs 94, as shown in FIG. 5, to place the position limiters in a first position relative to the conveyor belt.

Figure 5:
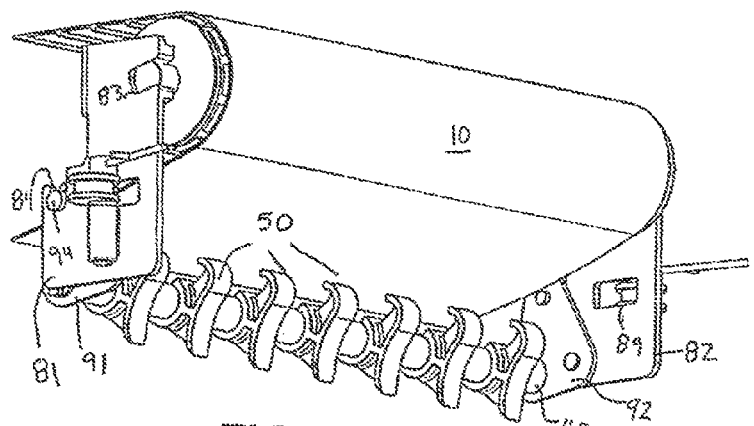
FIG. 5 is an assembled view of the system of FIG. 4 during mounting of the position limiter assembly.
Figure 6:
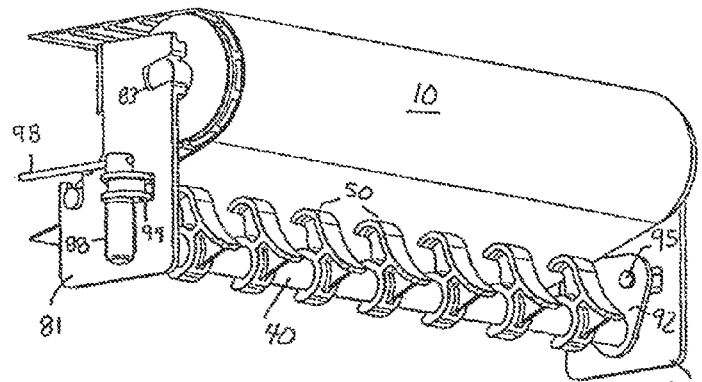
FIG. 6 shows the system of FIG. 5 in a subsequent step during the mounting process.
Figure 7A:
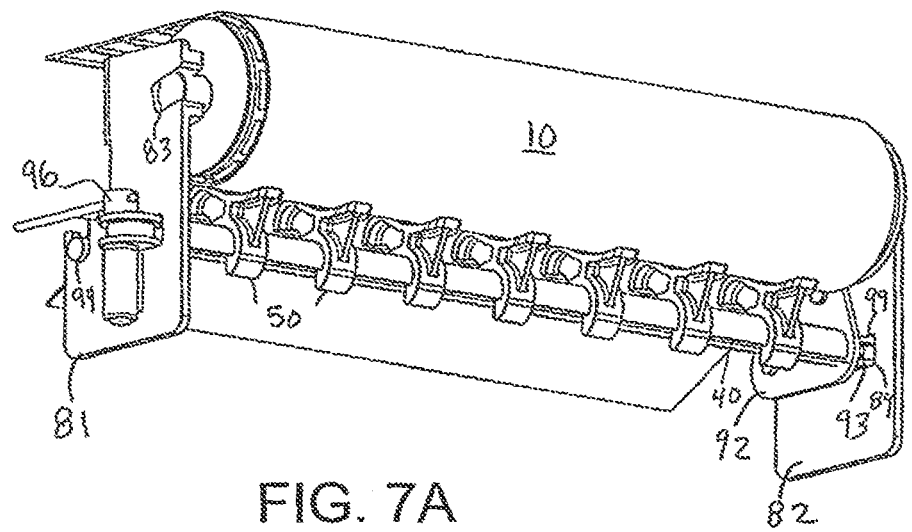
FIG. 7A shows the system of FIG. 5 when fully assembled.
Figure 7B:
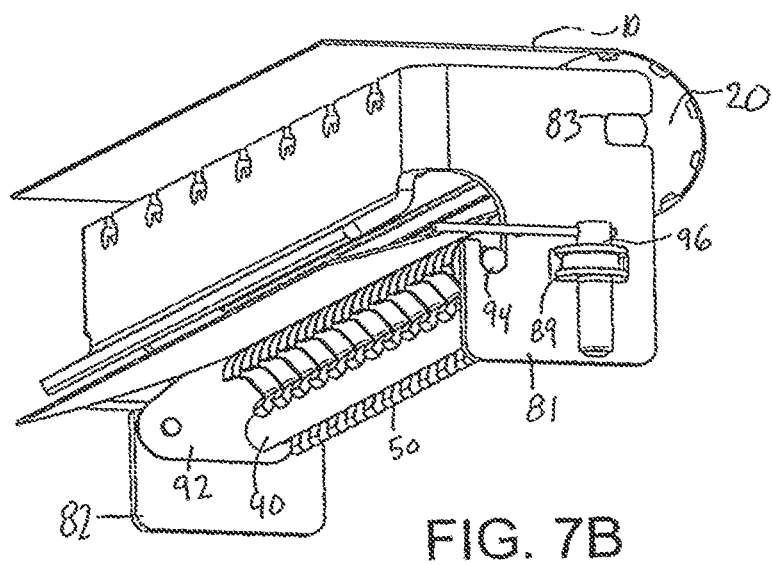
FIG. 7B is an interior view of the assembled system of FIG. 7A.

After the mounting tabs 94 are inserted in the recesses 84, the tool stem 97 is inserted in a pocket 88 such that groove in the cam portion 99 is disposed adjacent a tool opening 89 in the conveyor end plate, as shown in FIG. 5. Then, the shaft assembly is rotated about the mounting tabs 94, such that the tabs 95 align with the openings 89. Initially, the tools 96 are positioned such that the cam channel is spaced from the opening. A user moves the handle 98, pivoting the tool 96 around the stem 97, causing the offset cam portion 99 to rotate into engagement with the tab 95, locking the shaft assembly into the position shown in FIG. 6 relative to the conveyor belt 10. Then, a user or automatic tool then releases the tools and rotates the shaft assembly into an engaged position, shown in FIGS. 7A and 7B. In the engaged position, the position limiters 50 are disposed adjacent to the conveyor belt at a selected position suitable for ensuring engagement of the sprocket 20 and belt 10. In this position, the tabs 93 align with the openings 89. The tools 96 are then rotated into engagement position to retain the tabs 93 and shaft assembly in the engaged position. The shaft assembly may be easily moved into an unengaged position or removed from the conveyor frame, if desired.

Figure 8:
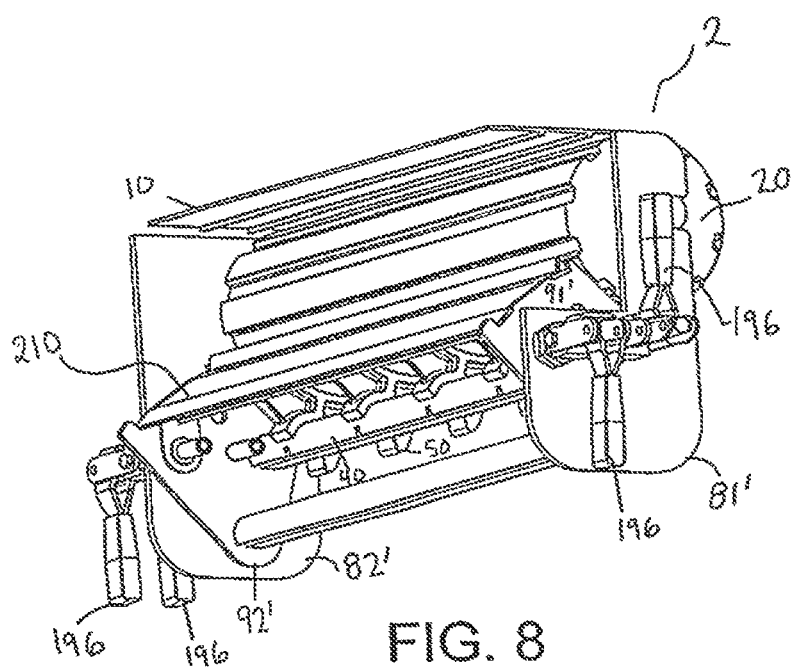
FIG. 8 is another view of a low-tension, direct drive conveyor belt system including a position limiter assembly according to another embodiment of the invention.

FIG. 8 shows another embodiment of a conveyor 2 employing position limiters 50 for a conveyor belt 10 on a motorized pulley or a shaft containing at least one sprocket 20 according to another embodiment of the invention. In this embodiment, tools 196 are used to secure a shaft assembly, comprising a shaft 40 with position limiters mounted thereon and extending between two shaft mounting plates 91' 92', in an engaged or disengaged position relative to sprocket mounting plates 81', 82'. The illustrative tools 196 are DE-STA-CO material handling clamps, available from DE-STA-CO of Auburn Hills, Mich. The tools 196 selectively insert pins in openings in the side plates 81', 82', 91', and-or 92' to help position the shaft assembly.

Other suitable handles for positioning an array of position limiters relative to a belt may be used. For example, a handle that connects to a shaft 40 and can lock into place may be used to maneuver an array of position limiters on the shaft.

FIG. 8 also shows a belt guide 210 connected to the shaft assembly to help guide the conveyor belt 10 after release from the sprocket 20.

FIGS. 9A and 9B illustrate a position limiter 150 including rollers according to another embodiment of the invention. The position limiter 150 includes a limiting surface formed by two rollers 156 and 155. The two limiting rollers 155, 156 are placed approximately one sprocket pitch apart near the driving tooth and tooth discharge position. The rollers are mounted between side plates 152, 153 using axles 157, 158. The roller position limiter 150 is particularly suitable for abrasive environments.

The position limiter 150 includes a snap clamp 160 formed by the side plates. The snap clamp is similar in form to the snap clamp of the position limiter 50.

The body of the position limiter is formed by two side plates 152, 153 that flank the rollers and form the snap clamp 160. In one embodiment, side plates 152, 153 may be plastic, the rollers may be UHMW and the axles may be stainless steel. As shown, the snap clamp 160 comprises a substantially semi-circular recess in the plates. The snap clamp 160 includes a barbed tip 166 and a tab 170.

In another illustrative embodiment, two position limiters are used to support one or more rollers between them. In this embodiment, not shown, the rollers or roller axles could be seated in saddles in the body of the limiter.

As shown in FIG. 10, the axles 157, 158 include an enlarged central portion and smaller diameter ends, where the axles extend into the side plates.

The side plates 152, 153 may be coupled together to mount the rollers and assemble the position limiter 150 through any suitable means, including, but not limited to, a snap-fit connection, gluing, welding or using a fastening device. When assembled, the plates form pockets for mounting the rollers 155, 156. The position limiter 150 controls tooth hand-off between a positively-driven belt and a drive sprocket using the two limiting rollers 155, 156.

Figure 11:
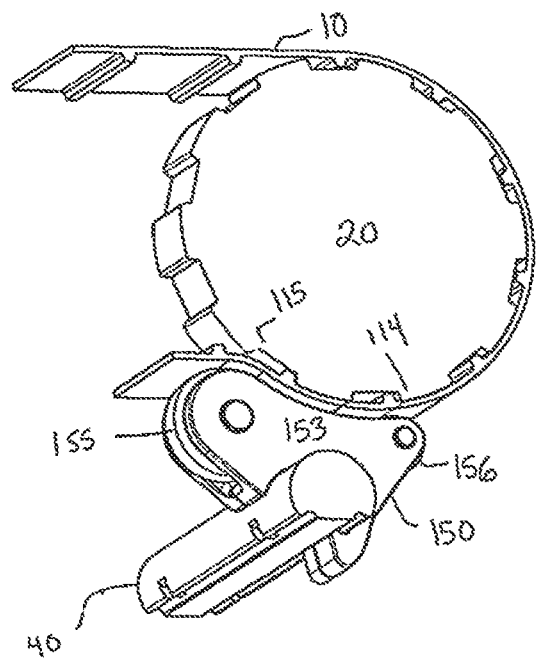
FIG. 11 is an isometric view of an end portion of a low-tension, direct drive conveyor belt system including the position limiter of FIG. 9A.

FIG. 11 shows the position limiter 150 when mounted to a shaft 40 to place the position limiter 150 relative to a conveyor belt 10 wrapped around a sprocket 20. The position limiter 150 mounts to the shaft 44 similarly to the position limiter 150. In the illustrative embodiment, the rear roller 155 is larger than the front roller 156. The upper edges of the plates 152, 153 have a slightly concave curve between two rounded ends where the rollers are mounted. The shape of the rollers and plate upper edges are selected such that the smaller front roller 156 contacts or abuts the conveyor belt at a limiting position 114 that is between about 160° and about 220° from the top, and preferably between about 165° and about 215° to perform limiting, while the larger rear roller 155 manages backbend in the belt 10 after release from the sprocket 20 at release position 115, which is preferably a distance of at least at least one sprocket pitch past the limiting position 114.

The mounting of the roller position limiter to a shaft 40 using the snap clamp 160 may lock the components in place relative to each other, as shown in FIG. 11.

Preferably, the rollers rotate freely on the axles.

The rollers may comprise roller halves that couple to form a complete roller. The width of the rollers may vary depending upon the requirements of the position limiter.

In addition, a third roller may be mounted between the front and rear rollers 155, 156 to provide additional limiting force. Any suitable number of rollers may form the limiting surface of the position limiter.

Figure 12:
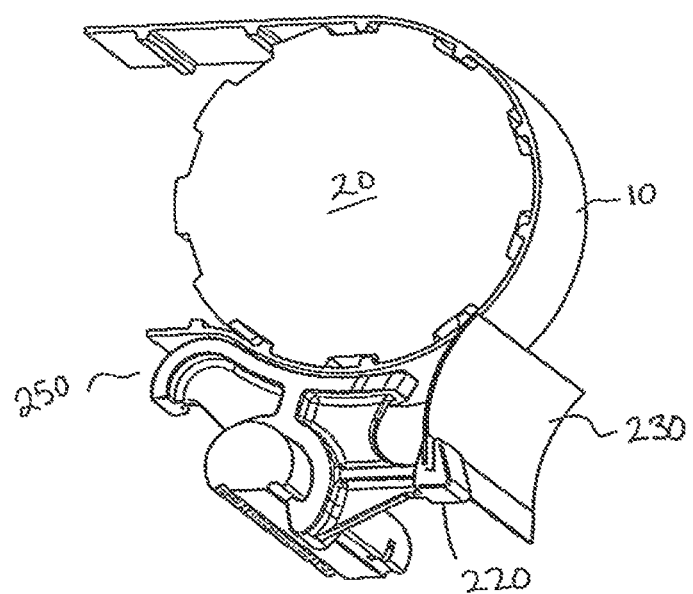
FIG. 12 is an isometric view of an end portion of a low-tension, direct drive conveyor belt system including a position limiter having a scraper mounted thereon according to another embodiment of the invention.
Figure 13:
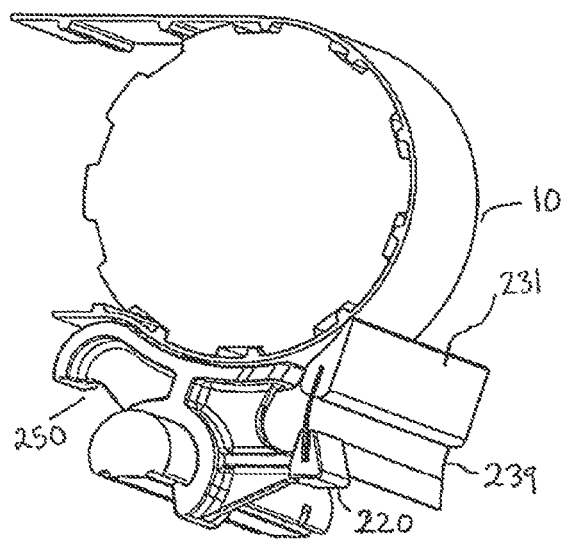
FIG. 13 is an isometric view of an end portion of a low-tension, direct drive conveyor belt system including a position limiter having an alternate scraper configuration.
Figure 14:
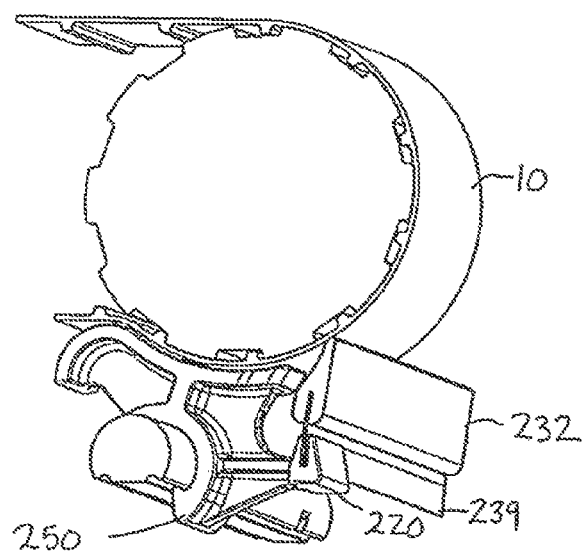
FIG. 14 is an isometric view of an end portion of a low-tension, direct drive conveyor belt system including a position limiter having an alternate scraper configuration.
Figure 15:
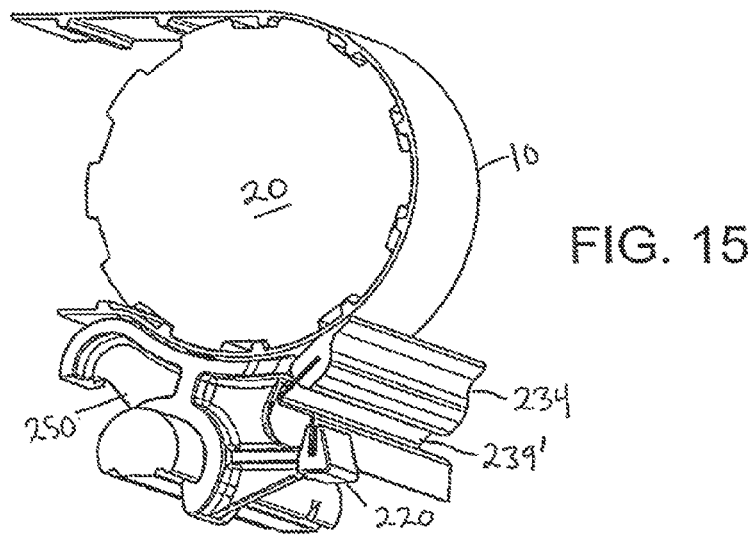
FIG. 15 is an isometric view of an end portion of a low-tension, direct drive conveyor belt system including a position limiter having an alternate scraper configuration.

According to another embodiment of the invention, shown in FIG. 12, a position limiter 250 may include a mounting arm 220 for receiving a conveyor belt scraper 230 or a base for a scraper. The scraper extends from the mounting arm 220 and contacts the conveyor belt to remove debris prior to the position limiter 250. The illustrative scraper is slightly curved due to the spring effect of the material, and has a constant cross-section, though the scraper may have any suitable shape.

In another embodiment, not shown, the mounting arm for receiving a belt scraper or base for a scraper includes an integrated snap clamp while omitting a limiter body.

Figure 16:
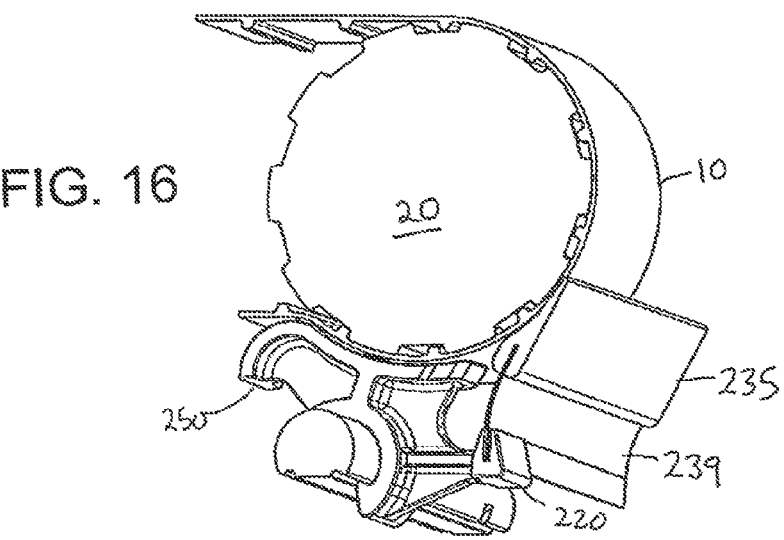
FIG. 16 is an isometric view of an end portion of a low-tension, direct drive conveyor belt system including a position limiter having an alternate scraper configuration

FIGS. 13-16 show various embodiments of scraper 231, 232, 233 and 234 mounted to a position limiter 250. For example, the scraper 231 of FIG. 13 has a substantially teardrop shaped cross-section with a planar front surface mounted to a base 239 inserted in the mounting arm 220 of the position limiter 250. The front surface and back surface taper to a tip for scraping the belt. The scraper 232 of FIG. 14 includes a planar front, a shaped rear surface and a curved scraping surface facing the conveyor belt 10. The scraper 234 of FIG. 15 includes a shaped outer surface and an inner surface having a lower section and an upper section that faces the conveyor belt, providing a larger contact area with the conveyor belt 10. The scraper 234 is connected to a bent base 239' inserted in the position limiter scraper arm 220. As shown in FIG. 16, in another embodiment, the scraper 235 may have a planar outer surface and a shaped inner surface that provides even larger contact area with the conveyor belt 10.

Figure 17:
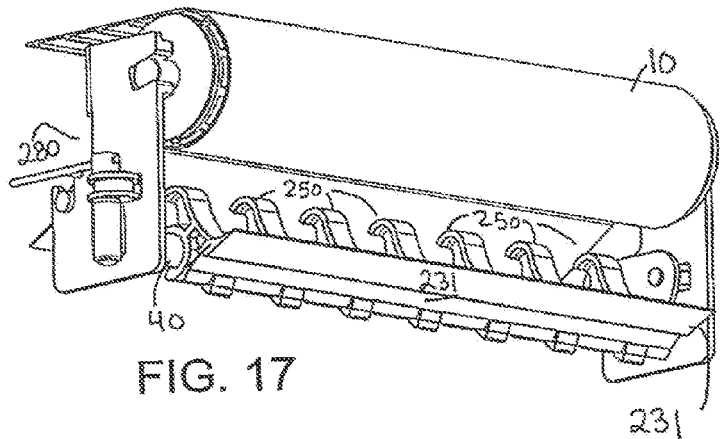
FIG. 17 shows a conveyor belt system including a position limiter assembly having a scraper mounted thereto.

FIG. 17 shows a mounting shaft 40 with a plurality of scraper position limiters 250 being mounted to a conveyor frame 280, similar to earlier embodiments. The shaft assembly is mounted to place the scraper 231 in scraping position relative to the conveyor belt 10.

In another embodiment, the scraper is independent of the position limiter and separately mounted to the shaft. The scraper holder may be mounted using a snap clamp or other suitable device to the shaft in a direction opposite the position limiter.

Figure 18:
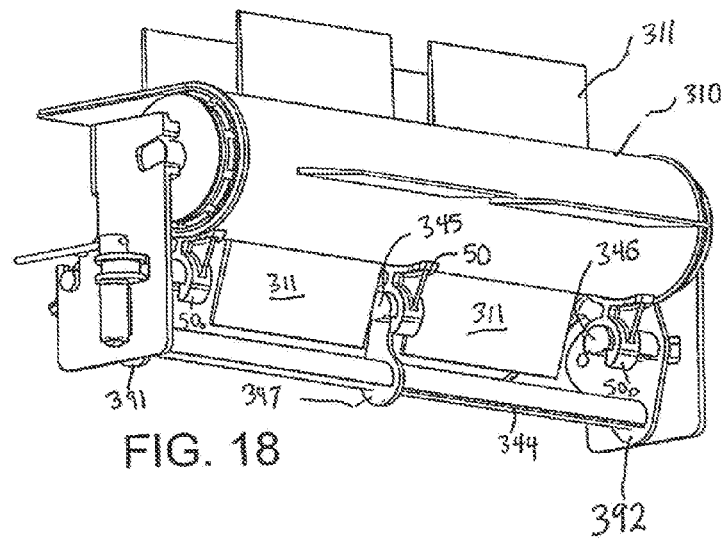
FIG. 18 is an end view of a low-tension, direct drive conveyor belt system including a position limiter assembly designed to accommodate flights in a conveyor belt.

According to another embodiment of the invention, shown in FIG. 18, the mounting plates and mounting bar for a series of position limiters may be configured to accommodate a conveyor belt with flights. For example, the mounting plate 391, 392 includes a dropped shaft 344 including a central connector 347 connecting to a mounting nub 345, upon which a central position limiter 50 is mounted. Nubs 346 extend from the side plates 391, 392 for mounting outer position limiters $50_o$. The configuration allows space between the shaft 344 and belt 310 to accommodate flights 311.

Figure 19:
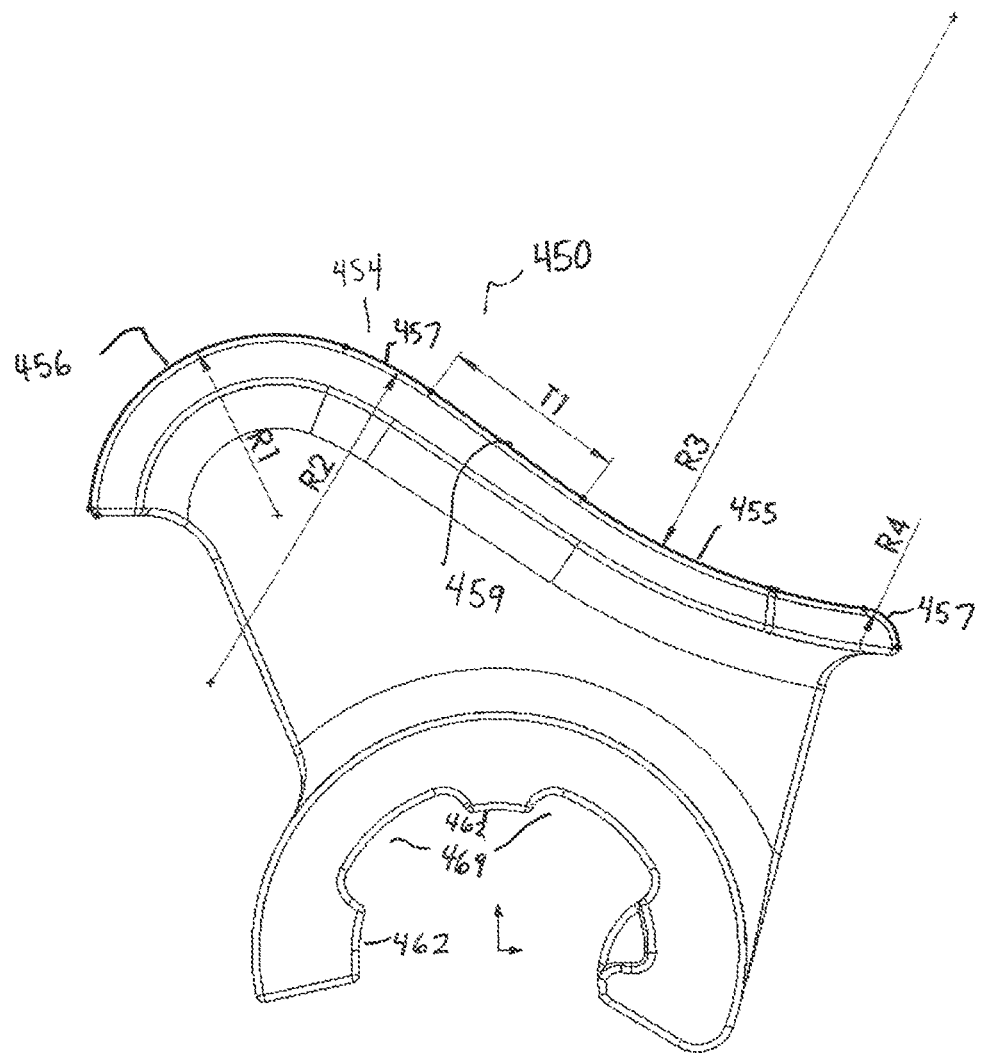
FIG. 19 shows another embodiment of a position limiter.

FIG. 19 shows another embodiment of a snap-on position limiter 450. The position-limiter 450 snaps onto a shaft configured to receive the position limiter 450. The position limiter is position relative to a drive element, such as a sprocket, to create a channel through which a direct drive conveyor belt passes. The snap-on position limiter 450 of FIG. 19 has a geometry configured to optimize the hand off of the leading driven tooth to an intermediate trailing tooth as the trailing tooth engages the sprocket. The snap-on position limiter 45 further includes recesses 469 in the clamp inner surface 462 to facilitate cleaning.

In the embodiment of FIG. 19, the radius $R_1$ of the convex portion 456 of the limiting surface 454 is designed to be smaller than the expected natural arc of curvature of the associated belt in that position, which is where the belt discharges. The radius $R_2$ in a transition location 457 of the limiting surface 454 is selected so that the limiting surface conforms to the belt as it discharges, ensuring that the belt does not backbend excessively. The radius $R_3$ of the concave portion is selected so that the concave portion 455 captures the immediately trailing tooth that is about to become fully engaged with the sprocket during handoff. The concave portion 455 includes a tangential extension 459, which functions to control the disengagement of the leading belt tooth from the sprocket during handoff, as the fully engaged tooth disengages. The tangential extension 459 can be a straight line, or a large-radius convex or concave shape, or even a shape having various radii. The leading edge 457 may form a curve having a radius $R_4$. The curve at leading edge 457 is configured to gently force a drive tooth back into a sprocket recess as the tooth approaches the limiter 450 in instances where the tooth loses synchronicity with the sprocket recess.

Figure 20:
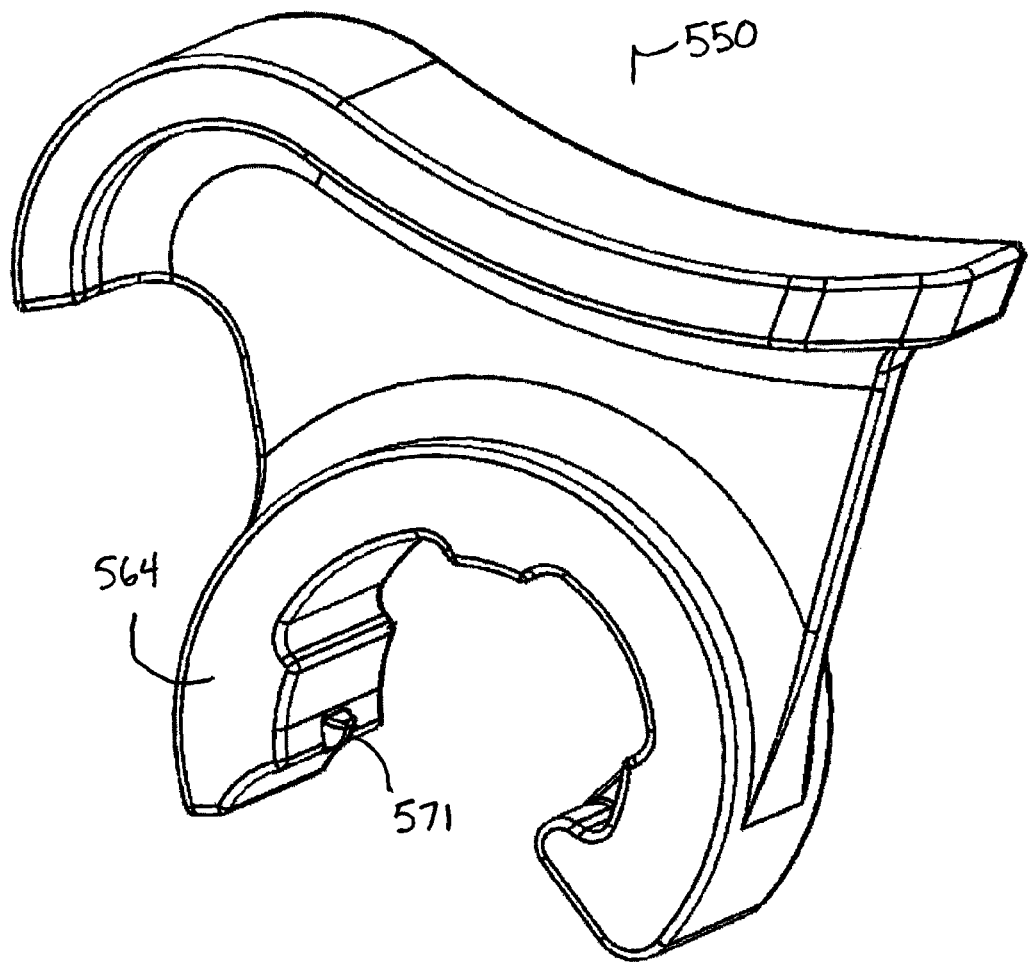
FIG. 20 shows another embodiment of a position limiter.
Figure 21:
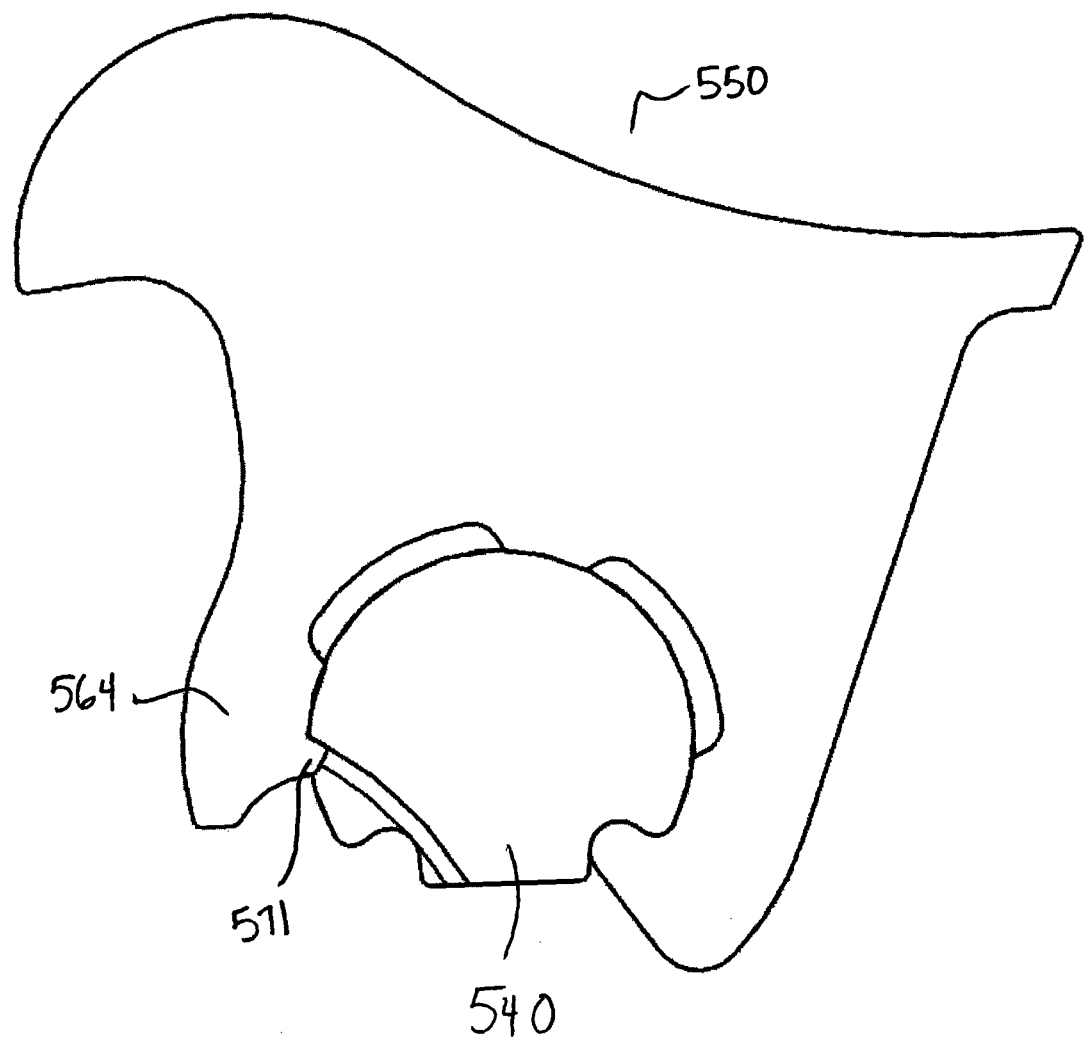
FIG. 21 shows the position limiter of FIG. 20 mounted to a shaft.

FIGS. 20 and 21 show a position limiter 550 including a button lock for securing the position limiter to a shaft 540. The position limiter 550 includes a snap clamp similar to the previous embodiments, but also includes a shaped first leg 564 forming a lip for receiving a corner of the shaped shaft 540. The first leg 564 includes an alignment or locking tab 571 to be received in a notch of the shaped shaft 540. Any suitable snap clamp design can be used to attach a position limiter to a shaft.

Figure 22:
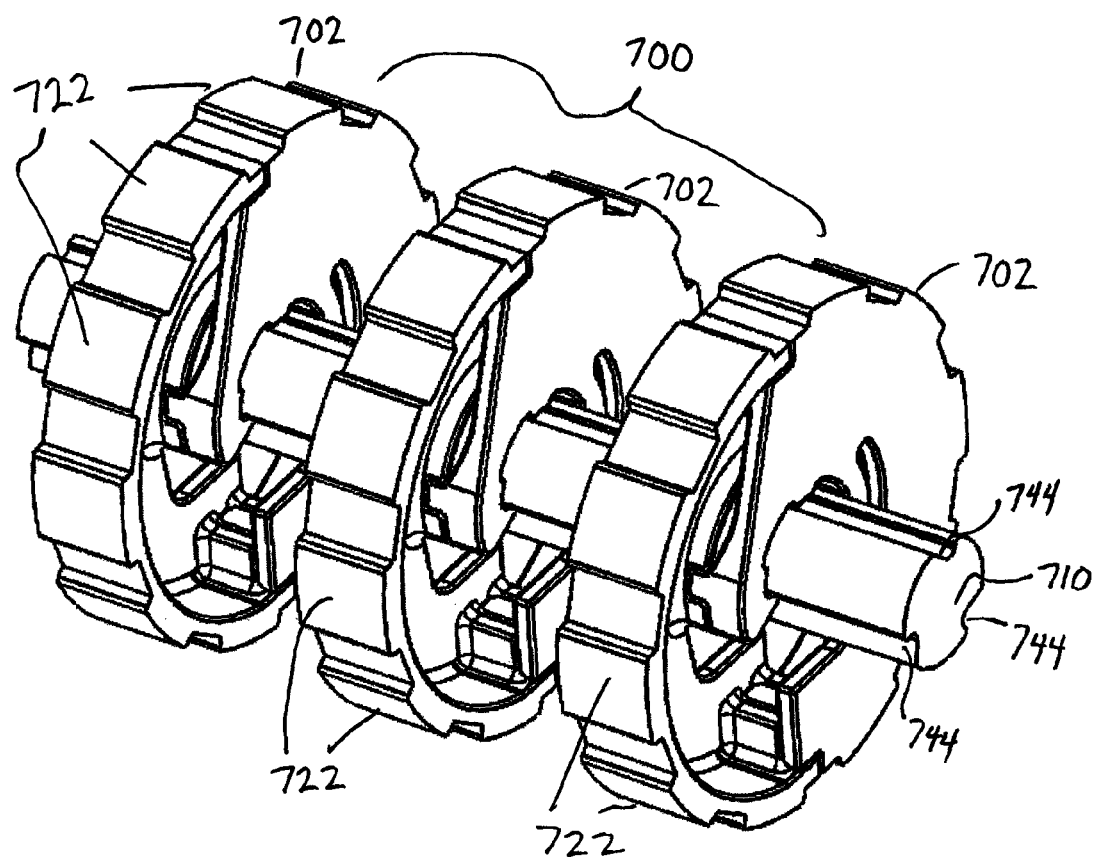
FIG. 22 shows a sprocket assembly mounted to a drive shaft.
Figure 23:
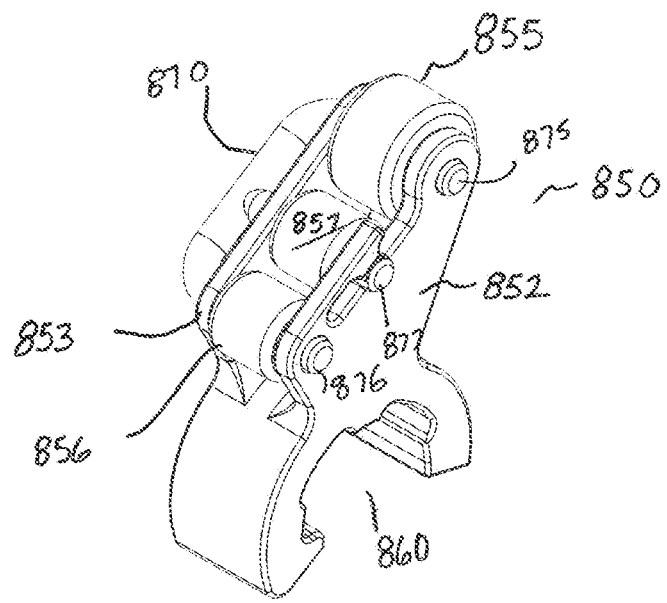
FIG. 23 is an isometric view of a position limiter including rollers forming a limiting surface according to another embodiment of the invention.
Figure 24:
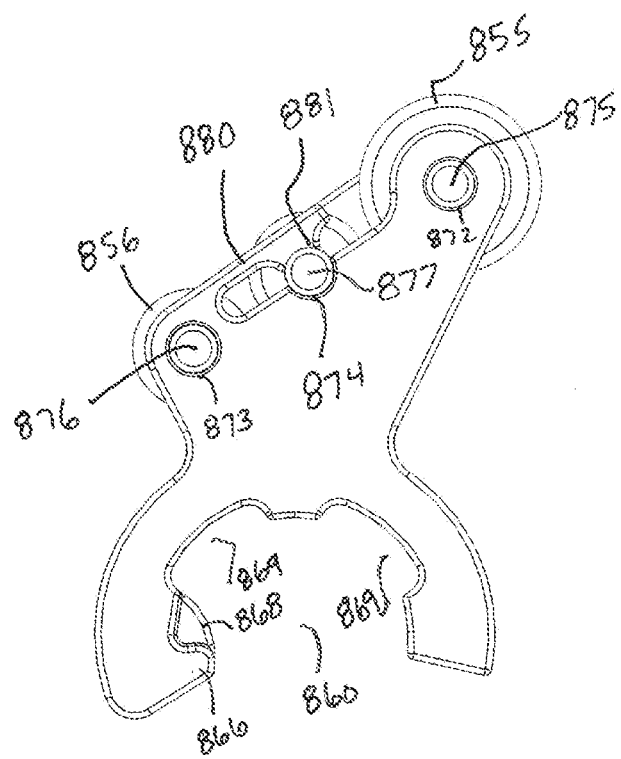
FIG. 24 is a side view of the position limiter of FIG. 23.
Figure 25:
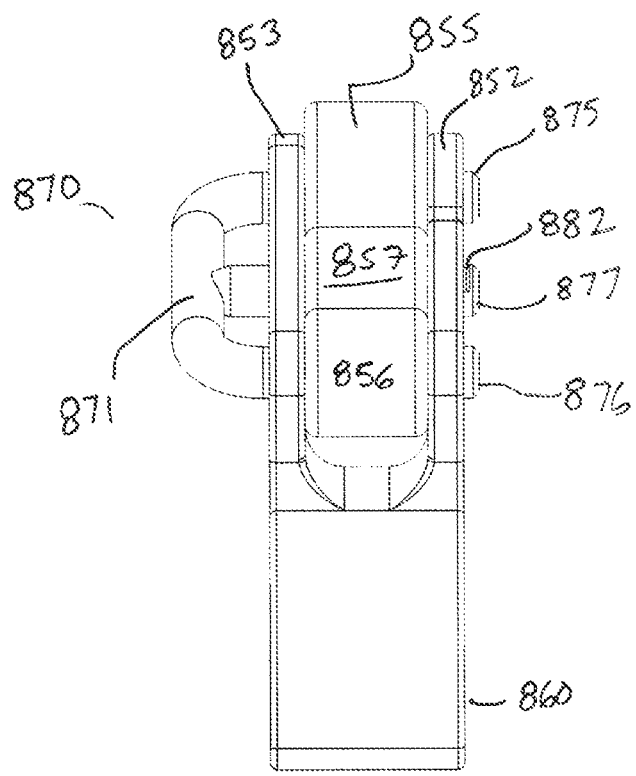
FIG. 25 is top view of the position limiter of FIG. 23.
Figure 26:
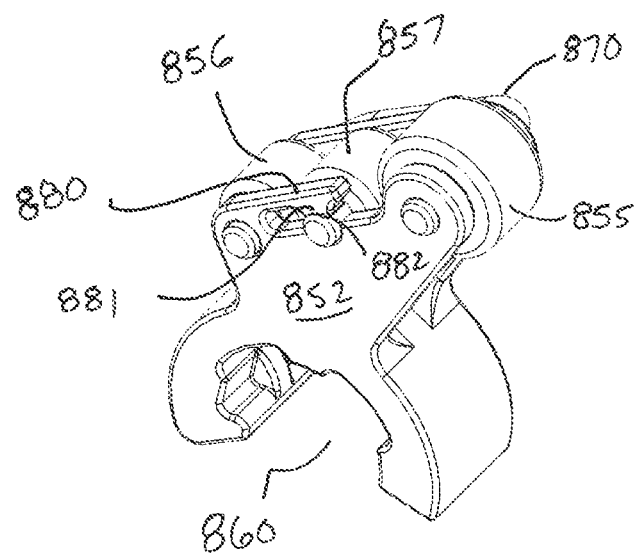
FIG. 26 is an isometric view of the position limiter of FIG. 23.
Figure 27:
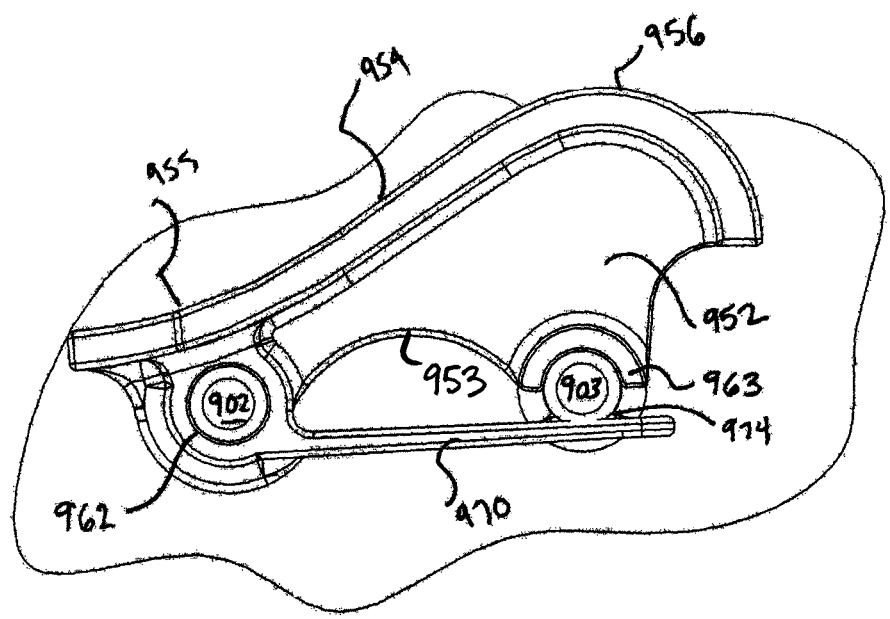
FIG. 27 is a side view of a position limiter suitable for limiting an edge of a conveyor belt according to another embodiment of the invention.
Figure 28:
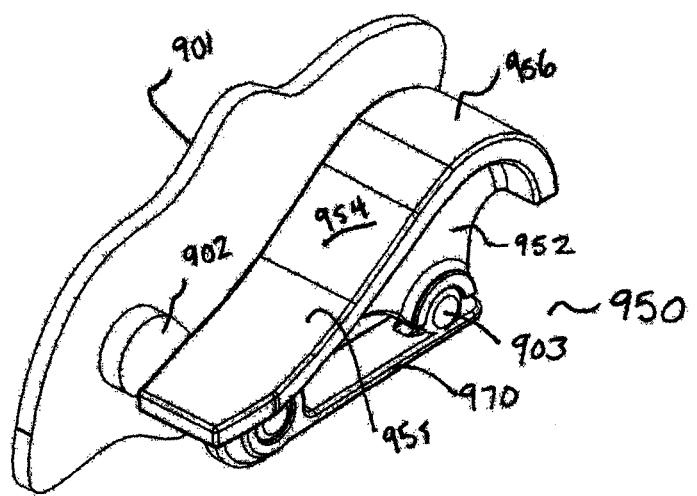
FIG. 28 is an isometric view of the position limiter of FIG. 27.
Figure 29:
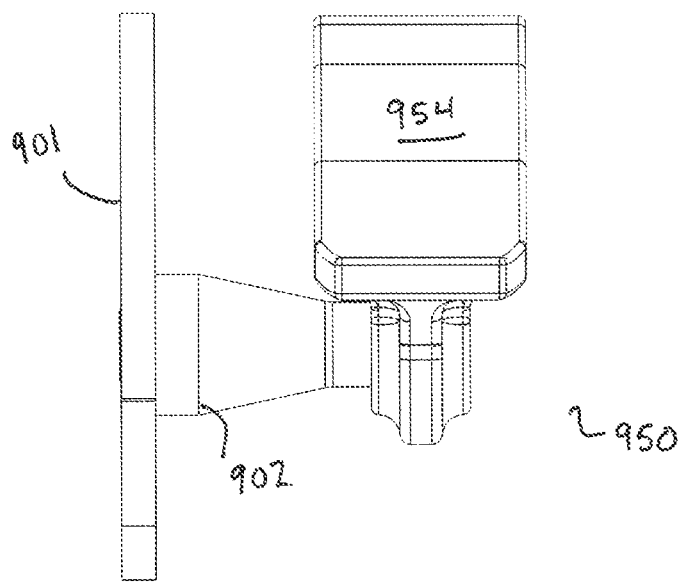
FIG. 29 is a front view of the position limiter of FIG. 27.
Figure 30:
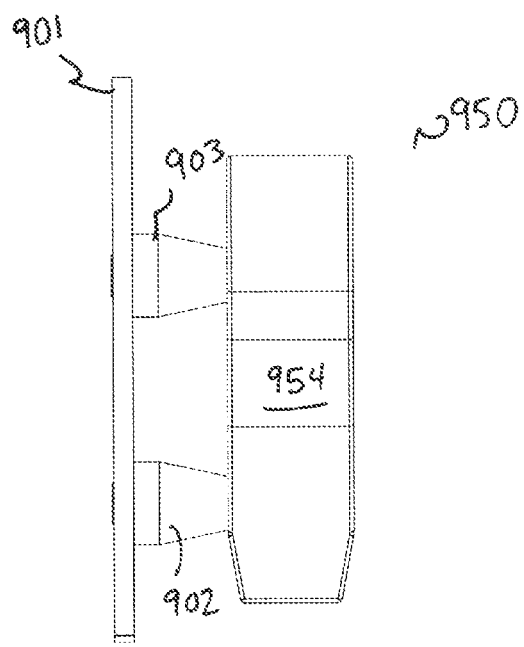
FIG. 30 is a top view of the position limiter of FIG. 27.
Figure 31:
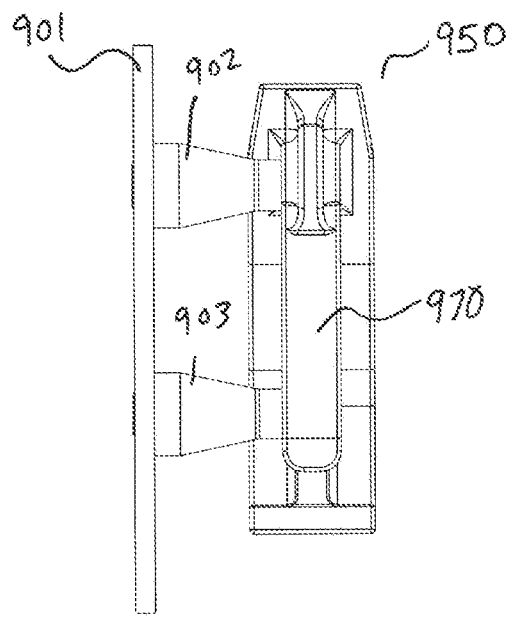
FIG. 31 is a bottom view of the position limiter of FIG. 27.
Figure 32:
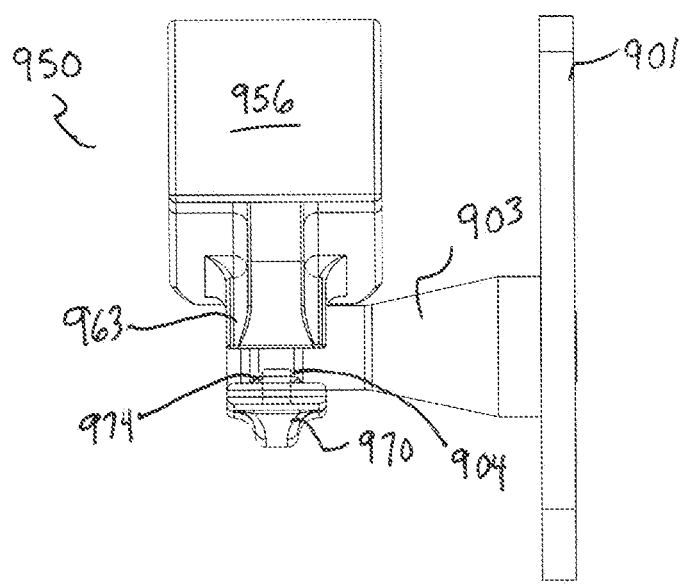
FIG. 32 is a rear view of the position limiter of FIG. 27.

FIG. 22 shows a sprocket assembly 700 suitable for use with a position limiter in a positive-drive conveyor belt system. The sprocket assembly 700 includes a plurality of snap-together sprockets mounted to a drive shaft 710. Each sprocket 702 comprises a pair of sprocket components shaped like a partial apostrophe and having peripheral drive teeth 722. Two sprocket components couple together and mount on the drive shaft 710 to form a complete sprocket 702. The drive shaft includes three channels 744 forming keyways for receiving protrusions on the sprocket components.

FIGS. 23-26 show another embodiment of a position limiter 850 including a limiting surface formed by rollers according to another embodiment of the invention. The position limiter 850 includes two side plates 852, 853 forming a body for mounting rollers 855, 856, 857 therebetween. The rollers form a limiting surface. The position limiter 850 also includes a snap clamp 860 below the side plates 852, 853 for mounting the position limiter, as previously described. As shown, the snap clamp 860 comprises an annular cuff having a barbed tip 866 and a tab 868, though the invention is not so limited. The illustrative snap clamp 860 includes cutouts or recesses 869 on the clamp inner surface 862 to facilitate cleaning.

The limiting rollers include a rear limiting roller 855, and two smaller limiting rollers 856, 857. A roller mount 870 mounts the rollers to the limiter body. The illustrative roller mount 870 comprises three axles 875, 876, 877 extending perpendicular to a spine 871 for mounting the rollers. Each axle extends through an opening in the first side plate 853, through the corresponding roller and through an aligned opening 872, 873 or seat 874 in the second side plate 852.

In one embodiment, the axles are separated by non-equal separation distances, i.e., the central axle 877 is closer to one of the end axles 875 or 876, ensuring that the larger roller will not be inadvertently inserted into the wrong position.

A locking mechanism locks the roller mount 870 to the limiter body to secure the assembly. In one embodiment, the locking mechanism comprises a flexible arm 880 connected to the second side plate 852 having a tab 881 for selectively engaging a notch 882 in the middle axle 876. The flexible arm 880 may be pulled back to release the middle axle 876 and allow the roller mount 870 to slide out of engagement with the roller body. Any suitable means for locking an axle to a position limiter body may be used.

FIGS. 27-35 show an embodiment of a position limiter for a conveyor belt that may be mounted along an edge of the conveyor belt according to another embodiment of the invention. The illustrative position limiter 950 is mounted to an inside edge of a conveyor frame 901.

The position limiter 950 includes an upper limiting surface 954 for guiding a conveyor belt. The upper limiting surface includes a convex curved portion 956 and a slightly concave portion 955. The limiting surface 954 may have any suitable size and shape and is not limited to the embodiment shown.

The position limiter 950 includes a body 952 and a mounting means for mounting the position limiter 950 to the frame 901. The mounting means comprises a first opening 962 for receiving a pin 902 connected to the frame. The first opening is disposed below the concave portion 955 of the limiting surface. Below the convex portion 956, the position limiter 950 includes a seat 963 for another pin 903 connected to the frame. The illustrative seat 963 is a semi-annular cuff for receiving the top portion of the pin 903. A locking tab 970 secures the pin 903 within the seat 963. The locking tab 970 comprises a flexible arm portion extending from a base surrounding the opening 962 and a protrusion 974 for engaging a groove 904 in the pin 903 to hold the position limiter in position. The locking tab 970 may be lifted to pull the protrusion out of engagement with the pin 903 and allow the position limiter to slide off the pins 902, 903.

As shown, the body of the position limiter includes a shaped bottom surface 953 to facilitate cleaning.

The illustrative pins 902, 903 include tapering middle sections, though the invention is not so limited.

Figure 33:
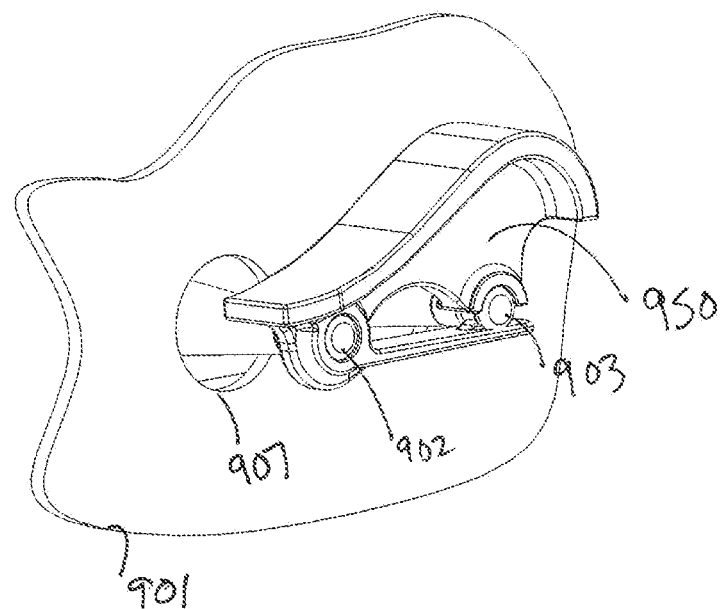
FIG. 33 is an isometric view of an edge position limiter mounted to a conveyor frame using a mounting device.
Figure 34:
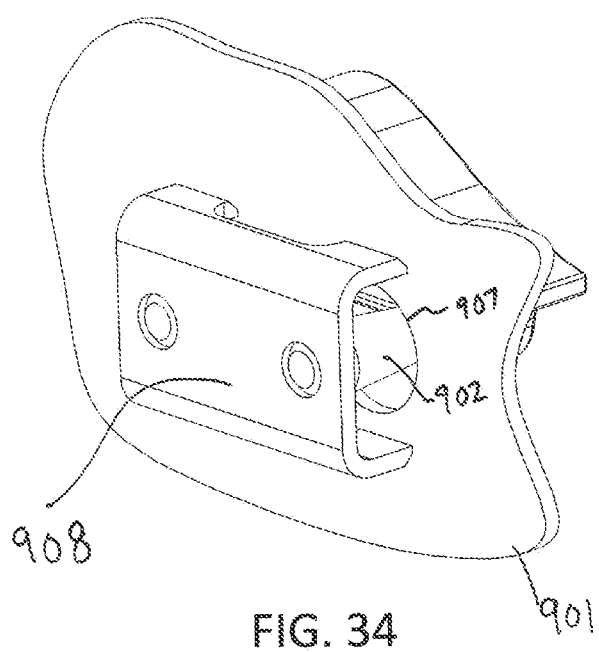
FIG. 34 is another view of the edge position limiter of FIG. 33.
Figure 35:
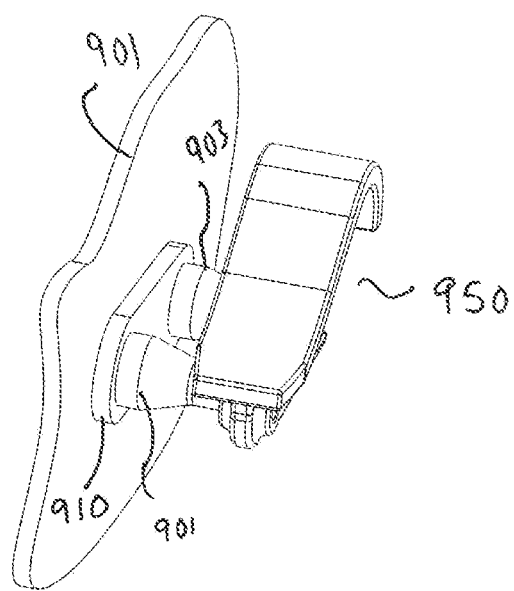
FIG. 35 shows another edge position limiter mounted to a frame using a mounting base.
Figure 36A:
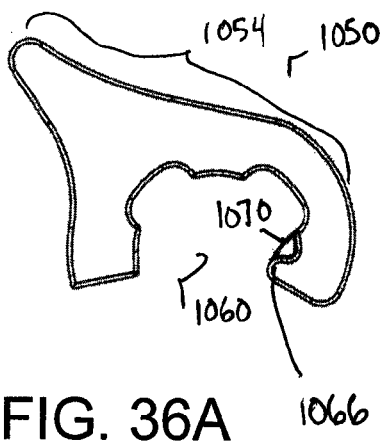
FIG. 36A is a side view of a position limiter according to another embodiment of the invention.
Figure 36C:
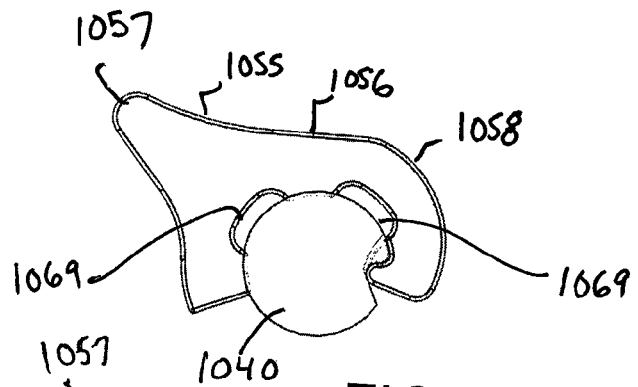
FIG. 36C is a side view of the position limiter of FIG. 36A mounted to a shaft.
Figure 36D:
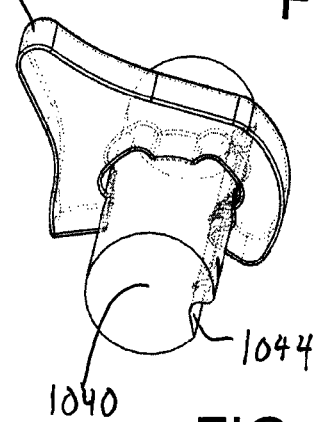
FIG. 36D is an isometric view of the position limiter and shaft of FIG. 36C.
Figure 36B:
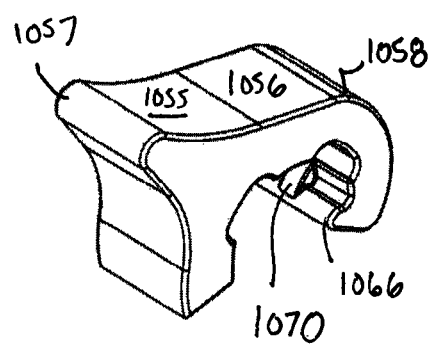
FIG. 36B is an isometric view of the position limiter of FIG. 36A.

As shown in FIGS. 33 and 34, the pins 902, 903 may be removably mounted to the frame 901 through openings 907 using a mounting device 908. In another embodiment, shown in FIG. 35, the pins 902, 903 used to mount the position limiter 950 to the frame 901 may be mounted to a base 910 that is then connected to the frame 901.

FIGS. 36A-36D show another embodiment of a position limiter 1050 suitable for using in a conveyor. The position limiter 1050 includes a snap clamp portion 1060 and a limiting portion, forming a limiting surface 1054. The limiting surface has a rounded nose 1057, a slightly concave portion 1055, a straight portion 1056 and a rounded end portion 1058 that transitions to the clamping portion outer surface. On the snap clamp portion, a tip 1066 engages a channel 1044 on a corresponding shaft 1040 and a tab 1070 engages an axial notch in the shaft (not shown) to clamp the position limiter 1050 onto the shaft 1040. The illustrative position limiter 1050 includes cutouts 1069 on the inner surface of the clamp to facilitate cleaning.

Figure 37A:
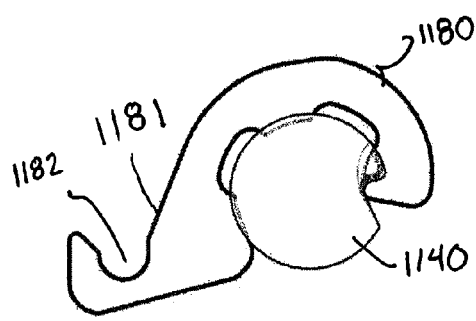
FIG. 37A-D show another embodiment of a scraper mount mounted to a shaft according to another embodiment of the invention.
Figure 37B:
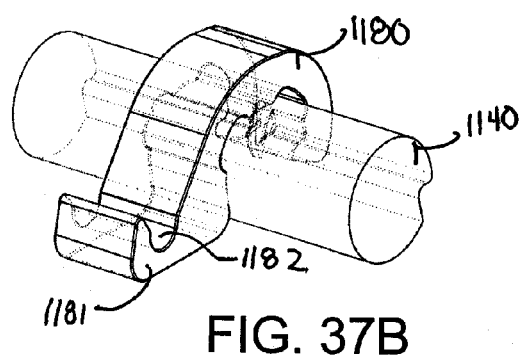
Figure 37C:
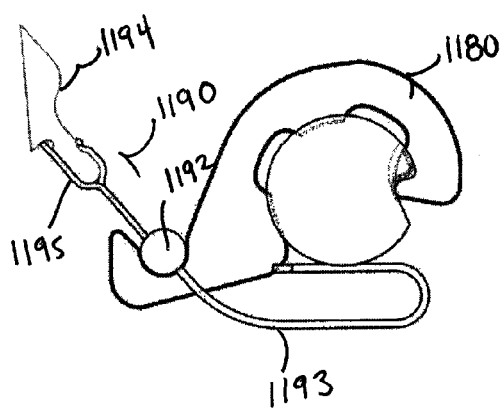
Figure 37D:
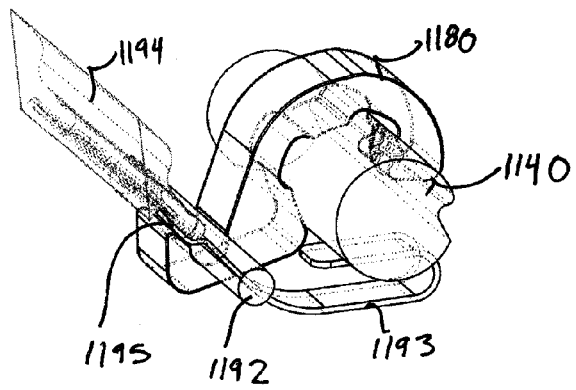

In one embodiment of the invention, a scraper mount may be used in conjunction with a position limiter to mount a scraper to a shaft on which one or more position limiters is mounted. For example, FIGS. 37A and 37B show a scraper mount 1180 mounted to a shaft 1140 using an integral snap clamp. The scraper mount 1180 includes a front foot 1181 extending from the main body of the scraper mount 1180. The foot 1181 includes a recess or channel 1182 for receiving a portion of a scraper 1190, as shown in FIGS. 37C and 37D. The scraper 1190 includes a mounting bar 1192 configured to be inserted in the channel 1182, a spring base 1193 and a scraper blade 1194 mounted in a blade receptacle 1195. The scraper mount 1180 easily snaps onto the shaft 1140 and holds a blade inserted in the blade receptacle in a proper position, as described below.

FIGS. 38A-38D show another embodiment of a scraper base 1293 connectable to a shaft via a scraper mount 1180. The scraper base 1293 can mount an elongated scraper blade using multiple blade receptacles 1295. The scraper base includes a mounting bar 1292 that can be inserted into a scraper mount recess to mount the scraper base to a shaft. The blade receptacles comprise wide front fingers 1296 and narrow fingers 1297. The wide front fingers 1296 determine the vertical position of the scraper blade. The narrow fingers 1297 pinch the scraper since the thickness of the scraper is greater than the channel formed between the wide and narrow fingers. When the scraper blade is inserted, the narrow fingers slightly deflect. In this position, the scraper is firmly held in place through friction.

Figure 38A:
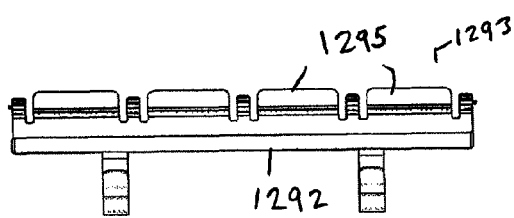
FIGS. 38A-38D show a scraper base suitable for use with the scraper mount of FIGS. 37A-37D.
Figure 38B:
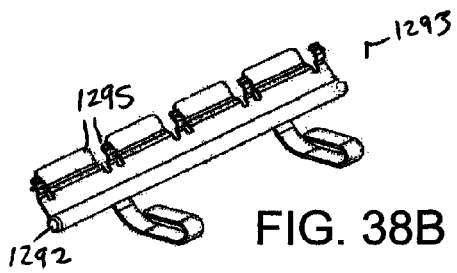
Figure 38C:
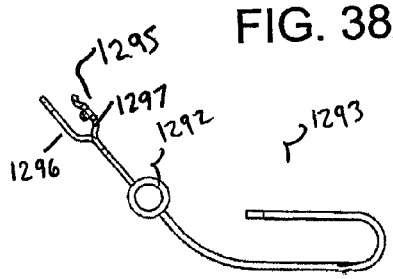
Figure 38D:
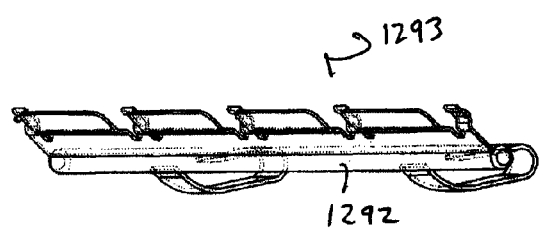
Figure 39A:
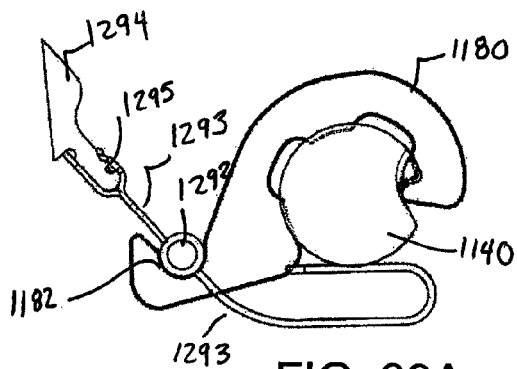
FIGS. 39A and 39B show a shaft including a plurality of scraper mounts mounted thereto and a scraper blade supported by the scraper mounts.
Figure 39B:
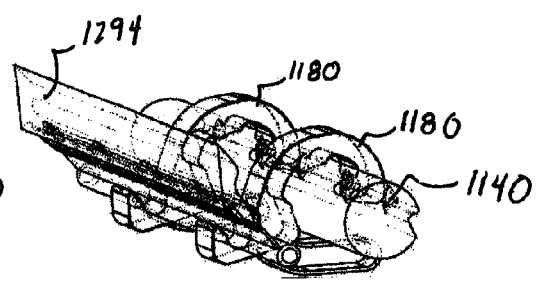

FIGS. 39A and 39B show a scraper assembly mounted to a shaft 1140 using the scraper base 1293 of FIGS. 38A and 38B. As shown, a scraper mount 1180 is mounted to a shaft using an integral snap clamp. The shaft 1140 has a channel and axial notches corresponding to the snap clamp, as described above. Then, a mounting bar 1292 of a scraper base 1293 is inserted in a receptacle 1182 of the scraper mount. A scraper blade 1194 is inserted in blade receptacles 1295 of the scraper base.

Figure 40A:
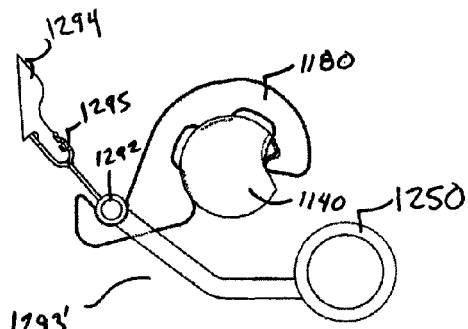
FIGS. 40A and 40B show another embodiment of a scraper blade assembly mounted to a shaft.
Figure 40B:
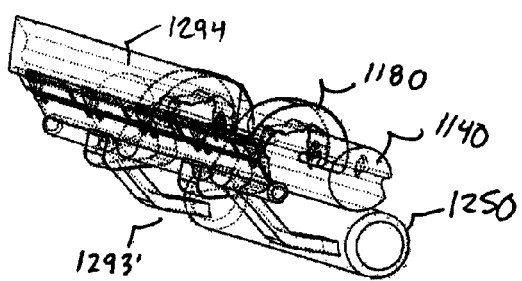

In another embodiment, shown in FIGS. 40A and 40B, a scraper assembly scraper base 1293' includes a weighted shaft 1250 to facilitate positioning of a scraper blade 1294 once mounted in the receptacles 1295. The weighted shaft 1250 serves as a counterweight so that the scraper base 1292 pivots within the base to maintain constant pressure of the scraper tip 1294 against the belt.

Figure 41A:
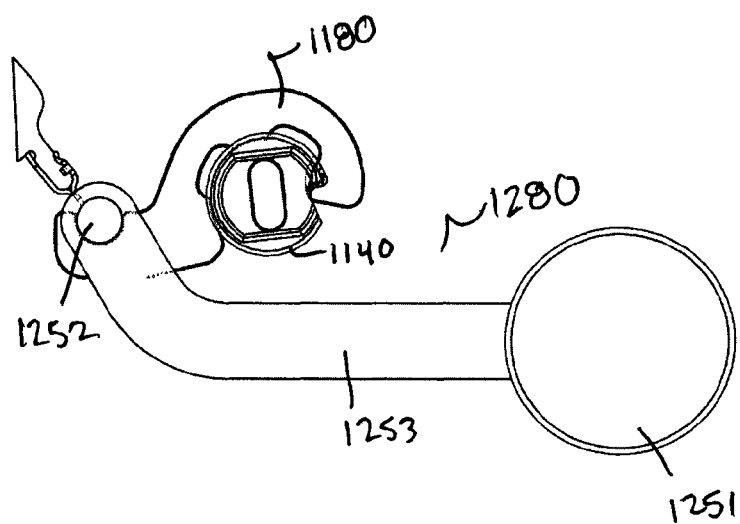
FIGS. 41A and 41B show another embodiment of a scraper blade assembly mounted to a shaft.
Figure 41B:
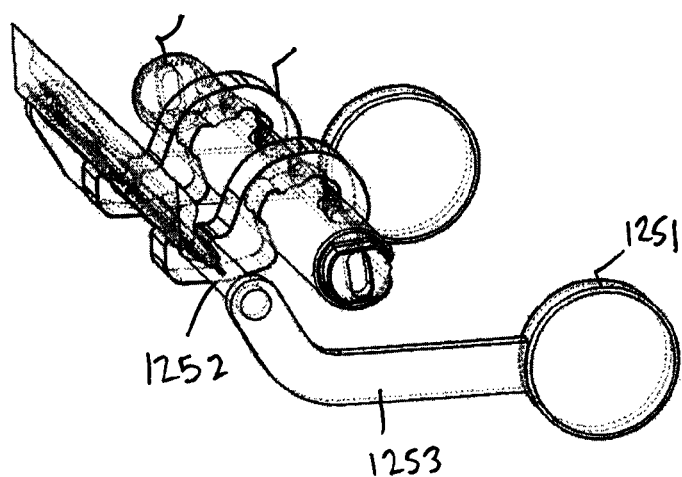

As shown in FIGS. 41A and 41B, a scraper mount 1280 can have weighted discs 1251 connected to the end of the mounting bar 1252 via connectors 1253. The weighted discs 1251 serve as counterweights to bias the scraper tip 1294 against the belt.

FIG. 42A is an exploded view of an end of a conveyor frame including position limiter assembly and scraper assembly according to an embodiment of the invention. The conveyor frame includes end plates 1301, 1302 for mounting a reversing element, such as a sprocket 1305, for driving or otherwise guiding a conveyor belt 1304. FIG. 42B is an isometric view of the end of FIG. 42A while assembled, without the sprocket and conveyor belt in place. FIG. 42C is an end view of the conveyor end with the sprocket and conveyor belt in place. The position limiter assembly 1300 includes a plurality of position limiters 1350 mounted to a shaft 1340 using integral snap clamps, as described above. Also mounted on the shaft 1340 is a series of scraper mounts 1380, which are also mounted using integral snap clamps. The illustrative shaft 1340 has three scraper mounts: one on each end and one in the middle. A scraper blade assembly 1370 is mounted to the scraper mounts 1380. The scraper blade assembly 1370 includes a mounting bar 1392, blade receptacles 1393, a scraper blade 1394 inserted in the receptacles 1393, curved plate mounting brackets 1372 connected to the ends of the mounting bar 1392, and handles 1374 extending out from the plate mounting bracket 1372. The use of a central support for a scraper blade improves the uniformity of the scraper against the belt surface, enhancing scraping. The shaft 1340 having the position limiters 1350 and scraper mounts 1380 mounted thereon is mounted between conveyor end plates 1301, 1302, which hold a sprocket 1305 or other reversing element around which a conveyor belt 1304 is trained. When assembled, the shaft 1340 holds the position limiters 1350 and scraper blade 1394 in position adjacent the conveyor belt 1304.

The assembly 1300 further includes bushings 1303 received in openings 1307 of the end plates 1301, 1302. On an outer side, each bushing 1303 receives a protrusion 1411 from a handle 1410. On an inner side, each bushing 1303 receives an end of the shaft 1340. The bushings 1303 also include pins 1308 that engage a curved channel 1412 on the handle 1410 and limit the rotation of the handle 1410. Rotation of the handle 1410 rotates the shaft 1340.

The handle 1410 may include an eccentric pin that fits through the busing 1303 and is received by a slot 1341 in the shaft 1340. As the handle 1410 is rotated and locked, the pin locks the shaft against a firm stop (either in the frame or the bushing) at the same time the handle also deflects and snaps onto an unrelated outer pin 1308 on the bushing. In such a position, the shaft 1340 is prevented from moving backwards.

Figure 43C:
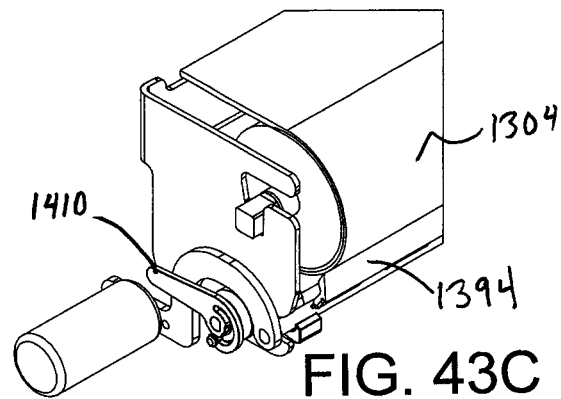
FIGS. 43A-C show the end portion of FIGS. 42A-42C in a first position.
Figure 43B:
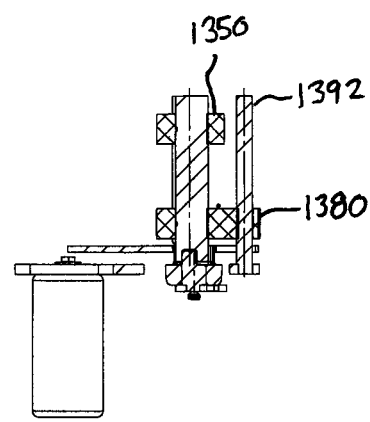
Figure 43A:
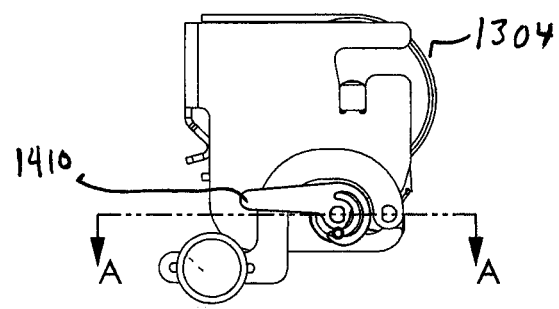

FIGS. 43A-43C show the end portion of the frame of FIGS. 42A-C with the handle 1410 in a first position. FIG. 43B is a cross-sectional view through lines A-A of FIG. 43A. With the handle 1410, the position limiter assembly 1300 and scraper blade assembly 1370 will be in a first position, placing the limiting surface of the position limiters 1350 and scraper blade 1394 adjacent to the conveyor belt 1304 in an operational mode. If the scraper blade is attached, a counterweight forces the scraper blade against the belt.

Figure 44C:
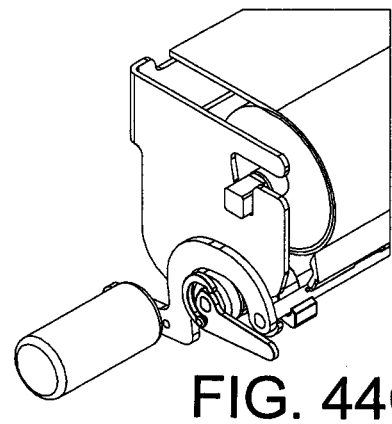
FIGS. 44A-44C show the end portion of FIGS. 42A-42C in a second position.
Figure 44B:
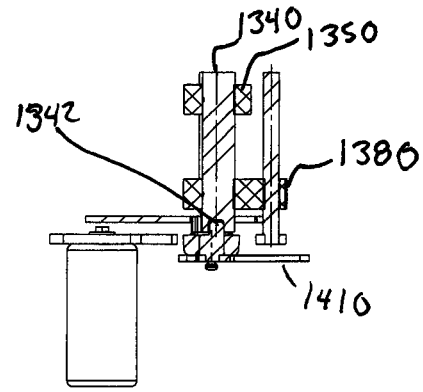
Figure 44A:
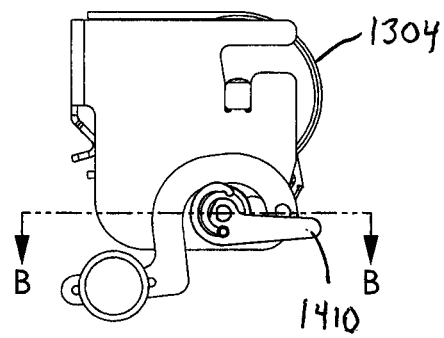

FIGS. 44A-44C show the end portion of the frame with the handle 1410 in a second position. In this position, the handle 1410 is rotated 180° from the first position. Because the handle 1410 is attached to the shaft 1340 with an offset pin 1342, rotation of the handle 1410 pushes the shaft 1340 and attached components 1350, 1380 forward slightly and away from the belt 1340. The position limiter is still in an operational position. If a scraper is installed, the counterweight of the scraper assembly can be listed to provide a sizable gap between the scraper and the belt and a small gap between the limiter and the belt so that some cleaning can be done during operation, if necessary.

Figure 45C:
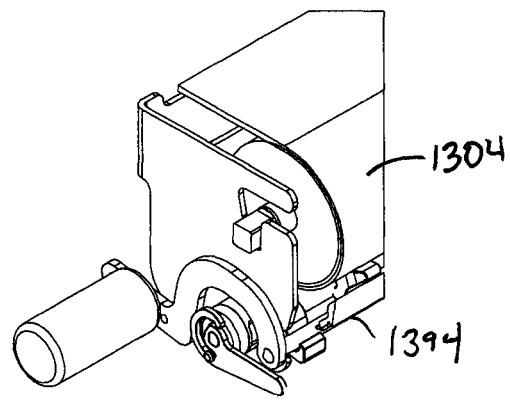
FIGS. 45A-45C show the end portion of FIGS. 42A-42C in a third position.
Figure 45B:
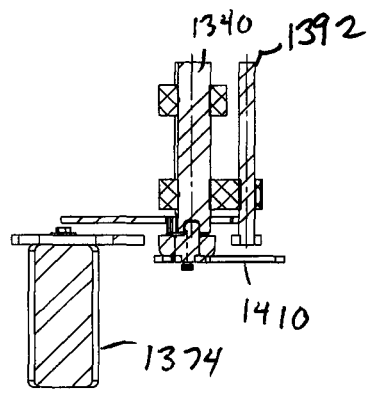
Figure 45A:
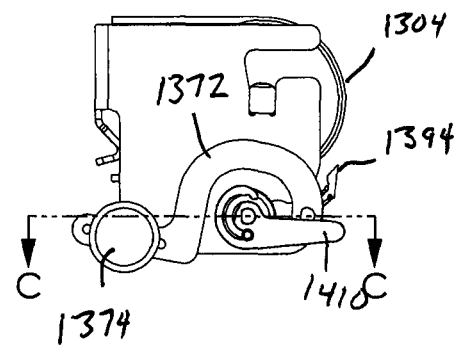

FIGS. 45A-45C show the end portion of the frame with the handle 1410 in the second position and the scraper blade assembly brackets 1372 moved to release the blade 1394. In this position, the handle 1374 and brackets 1372 of the scraper blade assembly 1370, released by the handle 1410, rotate about the mounting bar 1392 to push the blade 1394 away from the belt. This allows either removal of the blade 1394 for cleaning or another purpose or operation of the belt without scraping.

The unlocked handle 1410 can be removed from the assembly. When the handle 1410 is removed, the shaft 1340 can be moved forward within the openings 1307 and pivot downwards, exposing a different surface to the conveyor belt. In this position, the limiters can handle light loads so that the belt can be driven during the cleaning operation. Further, the shaft and limiters can pivot up and be removed from the conveyor.

The illustrative scraper blade assembly 1370 allows a scraper blade to be easily attached and removed from a conveyor without tools. The scraper blade assembly automatically pushes the blade into engagement with a conveyor belt and provides uniform scraping pressure.

The position limiter facilitates assembly, disassembly, operation and cleaning of a conveyor. The position limiter may be easily snapped onto a shaft designed to accommodate the position limiter and may be removed when necessary for cleaning or replacement. The position limiter may increase the wrap of a conveyor belt and be advantageously positioned away from a product stream. In addition, the illustrative embodiments locate the position limiter relative to a mounting shaft in a manner that increases the robustness of the position limiter. The position limiter is placed such that reactive forces from the belt transmit compressively through the plastic body to a shaft, which may be stainless steel, to increase the life of the position limiter and-or the loads the belt is able to convey.

The invention is not limited to the illustrative embodiments described above.

What is claimed is:

1. A position limiter for a conveyor belt, comprising:
a body;
a limiting surface extending at a first end of the body; and
a snap clamp at a second end of the body for fixing the body to a shaft, the snap clamp comprising a first leg and a second leg terminating in a barbed tip, the barbed tip having an inner tip surface that extends radially inwards from the second leg.

2. The position limiter of claim 1, wherein the limiting surface includes a concave portion and a convex portion.

3. The position limiter of claim 2, wherein the convex portion has a sharper curve than the concave portion.

4. The position limiter of claim 2, wherein the concave portion has a larger surface area than the convex portion.

5. The position limiter of claim 1, wherein the limiting surface comprises a first roller rotatably mounted to the body and a second roller rotatably mounted to the body and separated from the first roller by a selected distance.

6. The position limiter of claim 5, wherein the body comprises two side plates flanking the first roller and second roller, and the position limiter further includes a first axles extending through the first roller and into openings in the side plates and a second axle extending through the second roller and into openings in the side plates.

7. The position limiter of claim 5, wherein the first roller is smaller in diameter than the second roller.

8. The position limiter of claim 7, wherein first roller is disposed near a front end of the position limiter and the second roller is disposed near a rear end of the position limiter.

9. The position limiter of claim 8, further comprising a third roller between the first roller and the second roller.

10. The position limiter of claim 6, further comprising means for locking the first and second axles in place.

11. The position limiter of claim 1, wherein the first leg comprises a first curved leg, and the second leg comprises a second curved leg.

12. The position limiter of claim 11, further comprising an axial alignment tab extending between the barbed tip and a radially inner surface of the second curved leg to engage in a mating notch in the shaft.

13. The position limiter of claim 11, wherein the internal diameter of the first and second curved legs is smaller than the outer diameter of the shaft so that the snap clamp remains strained when in clamped position.

14. The position limiter of claim 11, wherein the first and second curved legs contain recesses on an inner surface to accommodate cleaning and to permit manufacturing with looser tolerances while directing clamping pressure to the tip and the end of the first curved leg.

15. The position limiter of claim 11, wherein the first curved leg includes a protrusion on the inner periphery of the distal end of the leg to mate with a specific geometry in the shaft when situated in the clamped position.

16. The position limiter of claim 11, wherein the first curved leg extends with an increased inner diameter toward the second curved leg so that the legs together inhibit removal from the shaft when in an unclamped position.

17. The position limiter of claim 11, wherein the first curved leg extends with an increased inner diameter to connect with the second curved leg so that the legs together prohibit removal from the shaft when in an unclamped position.

18. The position limiter of claim 1, further comprising a scraper arm extending forward from said body, the scraper arm including a recess for holding a scraper.

19. The position limiter of claim 18, further comprising a scraper inserted in the recess.

20. The position limiter of claim 19, wherein the scraper comprises a scraper base and a scraper tip.

21. The position limiter of claim 20, wherein the scraper base is comprised of a spring-like material to enable the scraper tip to exert pressure along the contour of a running conveyor belt.

22. The position limiter of claim 1, wherein the snap clamp comprises a seat for receiving a top portion of the shaft and a flexible tab for retaining the shaft within the seat.

23. The position limiter of claim 22, where the flexible tab includes a protrusion and the shaft includes a groove for receiving the protrusion to secure the position limiter to the shaft.

24. The position limiter of claim 1, wherein the position limiter has a rounded nose at an end of the limiting surface.

25. A direct drive conveyor comprising:
an endless belt;
at least one drive sprocket for engaging and driving the endless belt, the sprocket having drivers spaced at a selected sprocket pitch;
a first shaft below the drive sprocket including a longitudinal recess; and
a position limiter mounted to the shaft using a snap clamp having a tip configured to be inserted in the longitudinal recess such that a limiting surface of the position limiter faces the endless belt to ensure engagement between the drive sprocket and endless belt without increasing tension throughout the belt.

26. The direct drive conveyor of claim 25, wherein one of the belt and the at least one drive sprocket has teeth and the other of the belt and the at least one drive sprocket has recesses adapted to receive the teeth as the belt wraps around the at least one drive sprocket to a release point.

27. The direct drive conveyor of claim 26, wherein the at least one drive sprocket has a pitch greater than the belt pitch with only one tooth or recess on the belt at a time being driven by a corresponding drive recess or tooth on the at least one drive sprocket.

28. The direct drive conveyor of claim 25, wherein the limiting surface comprises at least one roller extending from an upper edge of the position limiter.

29. The direct drive conveyor of claim 25, further comprising a scraper extending from a front side of the position limiter.

30. The direct drive conveyor of claim 25, further comprising a second shaft below the first shaft, the second shaft connected to the first shaft using a connector.

31. The direct drive conveyor of claim 25, wherein the first shaft includes a notch for receiving a tab on the position limiter.

32. The direct drive conveyor of claim 25, wherein the limiting surface comprising a concave portion at a front end, wherein the concave portion has a length greater than the sprocket pitch.

33. The direct drive conveyor of claim 32, wherein the limiting surface further comprises a convex portion at a rear end, wherein position limiter is positioned such that the transition between the convex portion and concave portion abuts a release point between the conveyor belt and sprocket.

34. The direct drive conveyor of claim 25, further comprising a scraper assembly mounted to the shaft, the scraper assembly comprising a scraper mount mounted to the shaft using a snap clamp, a mounting bar coupled to the scraper mount, a scraper base attached to the mounting bar and a scraper blade inserted into the scraper base.

35. The direct drive conveyor of claim 34, further comprising a handle coupled to the shaft for orienting the scraper assembly and position limiter.

36. A position limiter for a conveyor belt, comprising:
a body;
a limiting surface extending at a first end of the body; and
a snap clamp at a second end of the body for fixing the body to a shaft, the snap clamp comprises a seat for receiving a top portion of the shaft and a tab for retaining the shaft within the seat.

37. The position limiter of claim 36, wherein the snap clamp comprises a first leg and a second leg terminating in a barbed tip, the tab extending between the barbed tip and an inner surface of the second leg.

38. The position limiter of claim 36, wherein the snap clamp comprises a pair of legs and the tab comprises a protrusion extending radially inwards from a leg of the snap clamp, and the shaft includes a groove for receiving the protrusion to secure the position limiter to the shaft.

39. A position limiter for a conveyor belt, comprising:
a body;
a limiting surface extending at a first end of the body;
a snap clamp at a second end of the body for fixing the body to a shaft; and
a scraper arm extending forward from said body, the scraper arm including a recess for holding a scraper.

40. The position limiter of claim 39, further comprising a scraper inserted in the recess.

41. A direct drive conveyor comprising:
an endless belt;
at least one drive sprocket for engaging and driving the endless belt, the sprocket having drivers spaced at a selected sprocket pitch;
a first shaft below the drive sprocket;
a position limiter mounted to the first shaft using a snap clamp such that a limiting surface of the position limiter faces the endless belt to ensure engagement between the drive sprocket and endless belt without increasing tension throughout the belt; and
a scraper assembly mounted to the shaft, the scraper assembly comprising a scraper mount mounted to the first shaft, a mounting bar coupled to the scraper mount, a scraper base attached to the mounting bar and a scraper blade inserted into the scraper base.

42. The direct drive conveyor of claim 41, wherein the scraper mount includes a snap clamp for mounting the scraper mount to the shaft.

43. The direct drive conveyor of claim 39, further comprising a handle coupled to the first shaft for orienting the scraper assembly and the position limiter.

* * * * *